US012759460B2

(12) United States Patent
Hinricher et al.

(10) Patent No.: US 12,759,460 B2
(45) Date of Patent: Oct. 13, 2026

(54) METHOD FOR INSTALLING AND UNINSTALLING A SENSOR POD

(71) Applicant: Kodiak Robotics, Inc., Mountain View, CA (US)

(72) Inventors: Court Scott Hinricher, Pacifica, CA (US); Gauri Rajendra Khanolkar, Sunnyvale, CA (US); Jay Kuvelker, San Francisco, CA (US); James Allen-White Hoffacker, San Carlos, CA (US); Robert Arnold Hegdahl, Wilhoit, AZ (US); Laura Weeks Shane, Park City, UT (US); Donald Burnette, Mountain View, CA (US); Tyler Lawrence Rosengren, Belvedere, CA (US); Michael Wiesinger, Mountain View, CA (US)

(73) Assignee: Kodiak Robotics, Inc., Mountain View, CA (US)

( * ) Notice: Subject to any disclaimer, the term of this patent is extended or adjusted under 35 U.S.C. 154(b) by 577 days.

(21) Appl. No.: 17/826,046

(22) Filed: May 26, 2022

(65) Prior Publication Data

US 2023/0406207 A1 Dec. 21, 2023

(51) Int. Cl.
*B60R 1/06* (2006.01)
*B60R 1/12* (2006.01)
(Continued)

(52) U.S. Cl.
CPC .............. *B60R 1/0605* (2013.01); *B60R 1/12* (2013.01); *B60R 11/0258* (2013.01);
(Continued)

(58) Field of Classification Search
CPC B60R 11/04; B60R 1/006; B60R 1/12; B60R 2001/1253; B60R 2001/1223;
(Continued)

(56) References Cited

U.S. PATENT DOCUMENTS

| | | | |
|---|---|---|---|
| 1,643,034 | A | 9/1927 | Ralph |
| 3,022,418 | A | 2/1962 | Ross et al. |

(Continued)

FOREIGN PATENT DOCUMENTS

| | | | |
|---|---|---|---|
| CN | 103858445 | A | 6/2014 |
| EP | 2722234 | A1 | 4/2014 |

(Continued)

OTHER PUBLICATIONS

Notice of Allowance dated May 22, 2024 directed to U.S. Appl. No. 17/826,039; 11 pages.

(Continued)

*Primary Examiner* — Christopher Garft
(74) *Attorney, Agent, or Firm* — Michele V. Frank; Venable LLP

(57) ABSTRACT

A method of installing a sensor pod on a vehicle includes aligning a sensor pod arm with a bracket attached to the vehicle, lowering the sensor pod arm onto the bracket, supporting the weight of the sensor pod on a support axle between the bracket and the sensor pod arm before rigidly coupling the sensor pod arm to the bracket, rotating the sensor pod arm into alignment with the bracket, and securing the sensor pod arm to the bracket. A method of uninstalling the sensor pod on a vehicle.

19 Claims, 22 Drawing Sheets

(51) Int. Cl.
*B60R 11/02* (2006.01)
*B60R 11/00* (2006.01)

(52) U.S. Cl.
CPC . *B60R 2001/1223* (2013.01); *B60R 2011/004* (2013.01); *B60R 2011/0052* (2013.01)

(58) Field of Classification Search
CPC ......... B60R 2011/004; B60R 2011/005; B60R 1/06; F16F 7/003
USPC .................................................. 248/477–479
See application file for complete search history.

(56) References Cited

U.S. PATENT DOCUMENTS 3,299,394 A 1/1967 Prescott
3,394,498 A 7/1968 Reinitz et al.
3,521,216 A 7/1970 Tolegian
3,611,274 A 10/1971 Katzin
4,836,491 A * 6/1989 Fimeri .................... B60R 1/066 248/549
4,863,397 A 9/1989 Hatch, Jr.
4,867,409 A * 9/1989 Fimeri .................... B60R 1/066 248/549
4,877,319 A 10/1989 Mittlehauser et al.
4,919,525 A 4/1990 Gilbert
4,973,147 A 11/1990 Fujita et al.
5,621,577 A 4/1997 Lang et al.
5,889,624 A 3/1999 Dickenson
5,949,591 A * 9/1999 Whitehead ............. B60R 1/076 248/478
5,959,790 A * 9/1999 Hempelmann ......... B60R 1/076 359/872
6,109,586 A 8/2000 Hoek
6,419,300 B1 7/2002 Pavao
6,533,424 B2 3/2003 Secanu
6,652,107 B1 11/2003 Lang
7,137,715 B2 11/2006 Schuumans
7,216,994 B2 5/2007 Pavao
7,261,272 B2 * 8/2007 Courbon ................. B60R 1/076 248/478
7,452,088 B2 11/2008 Brester
7,490,946 B1 2/2009 Foote
7,510,286 B2 * 3/2009 Waldmann .............. B60R 1/076 359/841
7,563,133 B2 7/2009 Stein
7,686,274 B2 3/2010 Branham
7,744,229 B2 * 6/2010 Oehmann ............... B60R 1/076 359/872
7,815,324 B2 10/2010 Sakata
8,336,845 B1 * 12/2012 Courbon ................. B60R 1/076 359/872
8,471,917 B2 6/2013 Werth et al.
8,602,573 B2 12/2013 Brester
8,657,249 B2 * 2/2014 Courbon ................. B60R 1/076 16/334
9,969,334 B2 5/2018 De Wind
9,987,989 B2 6/2018 Herrmann
10,044,137 B2 8/2018 Petrie et al.
10,220,788 B2 3/2019 Peterson et al.
11,305,724 B2 4/2022 Adams et al.
11,752,942 B2 9/2023 Contreras Sosa
11,787,340 B2 10/2023 Silva
11,953,623 B2 4/2024 Adams et al.
2002/0006001 A1 * 1/2002 Whitehead ............. B60R 1/078 359/872
2002/0048100 A1 4/2002 Hoek
2003/0026012 A1 2/2003 Pavao
2003/0193613 A1 10/2003 Matko
2005/0201113 A1 9/2005 Tuttle et al.
2008/0049344 A1 2/2008 DeWard
2009/0261226 A1 10/2009 Branham
2010/0020380 A1 1/2010 Tonar et al.
2010/0200252 A1 * 8/2010 Naylor ................. A01B 69/024 172/126
2011/0140917 A1 6/2011 Lynam
2021/0031692 A1 2/2021 Ning
2021/0053407 A1 2/2021 Smith et al.
2021/0086694 A1 3/2021 Rothschild
2021/0162930 A1 6/2021 Schmalriede et al.
2022/0080892 A1 3/2022 Whipps et al.
2022/0144185 A1 5/2022 Burnette et al.
2022/0227295 A1 7/2022 Salter
2023/0144329 A1 5/2023 Gough
2023/0382302 A1 11/2023 Hinricher et al.
2023/0382314 A1 11/2023 Hinricher et al.
2023/0382315 A1 11/2023 Hinricher et al.
2023/0382322 A1 11/2023 Hinricher et al.

FOREIGN PATENT DOCUMENTS

WO 2020/180707 A1 9/2020
WO 2021/204365 A1 10/2021

OTHER PUBLICATIONS

Non-Final Rejection dated May 24, 2024, directed to U.S. Appl. No. 17/826,000; 10 pages.
Final Rejection dated Aug. 29, 2024, directed to U.S. Appl. No. 17/826,000; 11 pages.
International Search Report and Written Opinion mailed Dec. 7, 2023, directed to International Patent Application No. PCT/US2023/023772; 14 pages.
Non-Final Rejection dated Jan. 22, 2024, directed to U.S. Appl. No. 17/826,039; 15 pages.
Notice of Allowance dated Oct. 17, 2024, directed to U.S. Appl. No. 17/826,039; 9 pages.
Notice of Allowance mailed Nov. 12, 2024, directed to U.S. Appl. No. 17/826,000; 9 pages.
U.S. Appl. No. 17/826,000, filed May 26, 2022.
U.S. Appl. No. 17/826,031, filed May 26, 2022.
U.S. Appl. No. 17/826,039, filed May 26, 2022.
U.S. Appl. No. 17/826,043, filed May 26, 2022.
Non-Final Rejection dated Feb. 21, 2025, directed to U.S. Appl. No. 17/826,043; 14 pages.
Notice of Allowance dated Mar. 21, 2025, directed to U.S. Appl. No. 17/826,000; 15 pages.
Notice of Allowance dated Mar. 27, 2025, directed to U.S. Appl. No. 17/826,039; 9 pages.
Final Rejection dated Jun. 18, 2025, directed to U.S. Appl. No. 17/826,043; 9 pages.
Non-Final Rejection dated Jul. 2, 2025, directed to U.S. Appl. No. 17/826,031; 9 pages.
Notice of Allowance dated Jul. 15, 2025, directed to U.S. Appl. No. 17/826,000; 10 pages.
Notice of Allowance dated Jul. 16, 2025, directed to U.S. Appl. No. 17/826,039; 9 pages.
Final Rejection dated Nov. 21, 2025, directed to U.S. Appl. No. 17/826,031; 8 pages.
Non-Final Rejection dated Mar. 19, 2026, directed to U.S. Appl. No. 17/826,031; 8 pages.

* cited by examiner

METHOD FOR INSTALLING AND UNINSTALLING A SENSOR POD

CROSS REFERENCE TO RELATED APPLICATIONS

The present application is related to co-pending U.S. Application Ser. No. 17/826,000, filed May 26, 2022, U.S. Application Ser. No. 17/826,031, filed May 26, 2022, U.S. Application Ser. No. 17/826,039, filed May 26, 2022, and U.S. Application Ser. No. 17/826,043, filed May 26, 2022, the entire contents of each of which are hereby incorporated by reference in their entireties.

TECHNICAL FIELD

The present disclosure relates to a method for installing and uninstalling a sensor pod.

BACKGROUND

Vehicles include side mirrors connected to the vehicle. Some side mirrors may be equipped to gather data and information, communicate with the vehicle, and may assist in navigating the vehicle.

BRIEF SUMMARY

According to an embodiment of the present disclosure, a method of installing a sensor pod on a vehicle includes aligning a sensor pod arm with a bracket attached to the vehicle, lowering the sensor pod arm onto the bracket, supporting the weight of the sensor pod on a support axle between the bracket and the sensor pod arm before rigidly coupling the sensor pod arm to the bracket, rotating the sensor pod arm into alignment with the bracket, and securing the sensor pod arm to the bracket.

According to an embodiment of the present disclosure, a method of uninstalling a sensor pod on a vehicle includes unsecuring a sensor pod arm from a bracket, rotating the sensor pod arm out of alignment with the bracket, disconnecting one or more conduits from the sensor pod, and raising the sensor pod arm off the bracket to disconnect a support axle between the bracket and the sensor pod arm.

Additional features, advantages, and embodiments of the present disclosure are set forth or apparent from consideration of the following detailed description, drawings and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
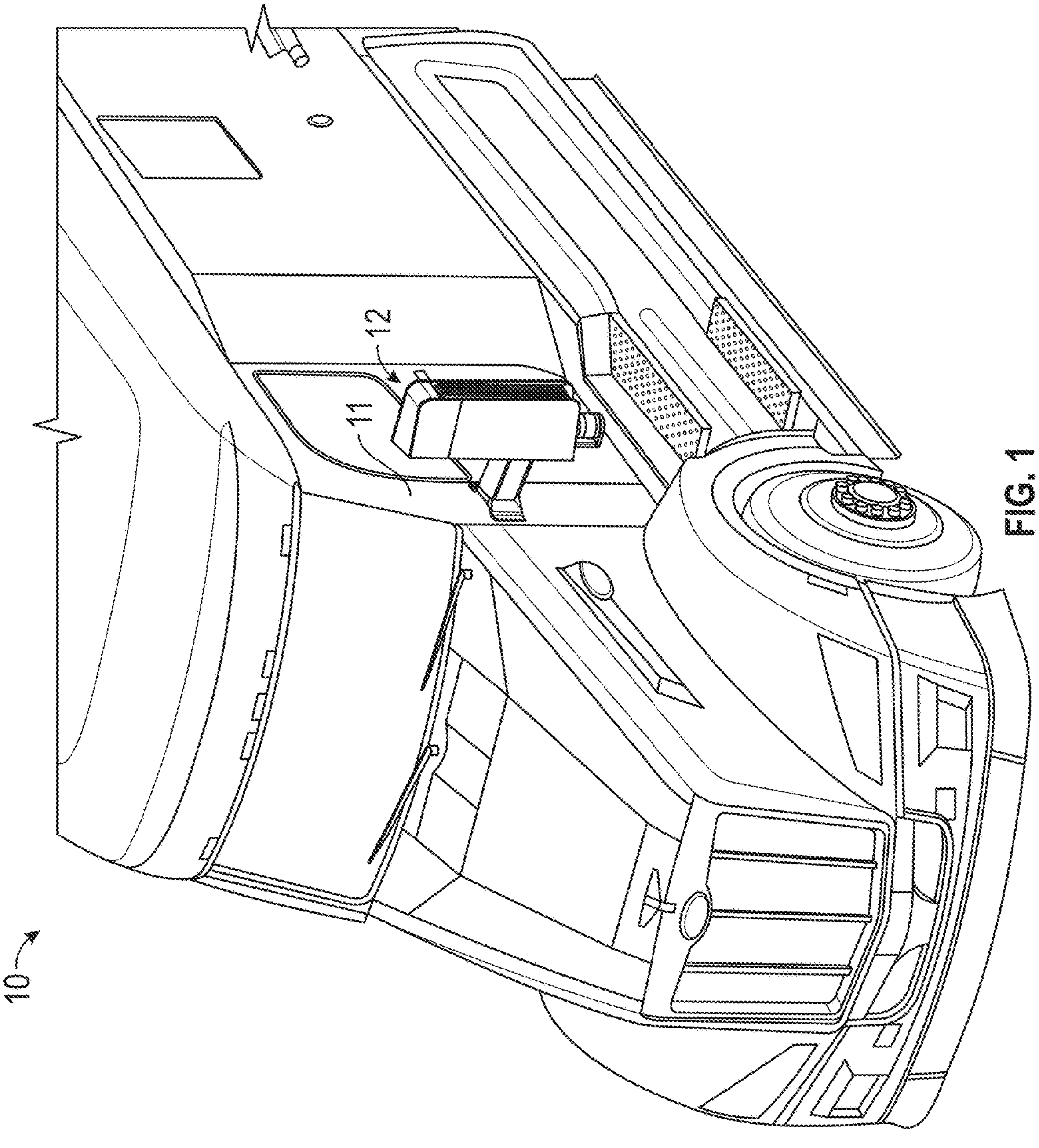
FIG. 1 illustrates a perspective view of a vehicle, according to an embodiment of the present disclosure.

Various embodiments are discussed in detail below. While specific embodiments are discussed, this is done for illustration purposes only. A person skilled in the relevant art will recognize that other components and configurations may be used without departing from the spirit and scope of the present disclosure.

As used herein, the terms "first," "second," and "third" may be used interchangeably to distinguish one component from another and are not intended to signify location or importance of the individual components.

The terms "forward" and "rearward" refer to relative positions of a vehicle. For example, forward refers to a position closer to front hood, front bumper, or front fender of the vehicle and rearward refers to a position closer to a rear bumper, rear trunk, or trailer of the vehicle.

The terms "coupled," "fixed," "attached," "connected," and the like, refer to both direct coupling, fixing, attaching, or connecting as well as indirect coupling, fixing, attaching, or connecting through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a one, two, four, ten, fifteen, or twenty percent margin in either individual values, range(s) of values and/or endpoints defining range(s) of values.

Vehicles include sensor pods connected to the vehicle. The sensor pods gather data and information, communicate with the vehicle, and may assist in navigating the vehicle. The sensor pods are connected to the vehicle by connecting assemblies. There remains a need for improved assemblies, systems, and methods for connecting sensor pods to vehicles. As described and shown herein, these may include, for example, a connecting assembly that reduces damage and debris in the event of a collision, a quick swap sensor pod, and/or a universal bracket or attachment.

In one aspect of the present disclosure, a sensor pod may flex back after an impact to reduce damage and debris after a collision. The connecting assembly may allow rotation on impact but is securely held with shear bolts to prevent vibration. In another aspect of the present disclosure, the quick swap sensor pod may be changed quickly, for example, in a few minutes. The connecting assembly allows for quick removal and/or install. Bolts are not required to initially mount the sensor pod to the vehicle. In another aspect, the connecting assembly provides for universal attachment for multiple mirror pod types and for universal attachment to multiple vehicle styles. In another aspect of the present disclosure, a sensor pod may be swapped by one individual without the need of additional support structures to manage the weight and positioning of the sensor pod.

In one aspect, the connecting assembly may include features to provide for alignment and position control of the sensor pod. For example, in a connecting assembly having a bracket and sensor pod arm, as discussed in more detail below, the sensor pod arm and bracket can be configured to provide for alignment and position control of the sensor pod when assembling the bracket and sensor pod arm. These features can reliably position the bracket and sensor pod arm such that they are in contact and/or in touching contact with each other, as described in more detail below. Various bracket and sensor pod arm contact configurations are contemplated, including one or more features to facilitate the alignment and/or contact. For example, in some examples, side surfaces of the bracket and sensor pod arms are in alignment with each other and may be in contact with each other. In some examples, raised portions of the bracket and the sensor pod arm are in alignment with each other and may be in contact with each other. Configurations that are compatible with manufacturing may be beneficial. The feature(s) and configurations can be configured, designed and/or manufactured to provide for reliable alignment and, in some examples, contact between the bracket and the sensor pod arm. The feature(s) can control a position of the sensor pod arm relative to the bracket and help align the connection between the sensor pod arm and the bracket. Details of the alignment, control, and in some examples, contact, are described in more detail to follow.

Figure 2:
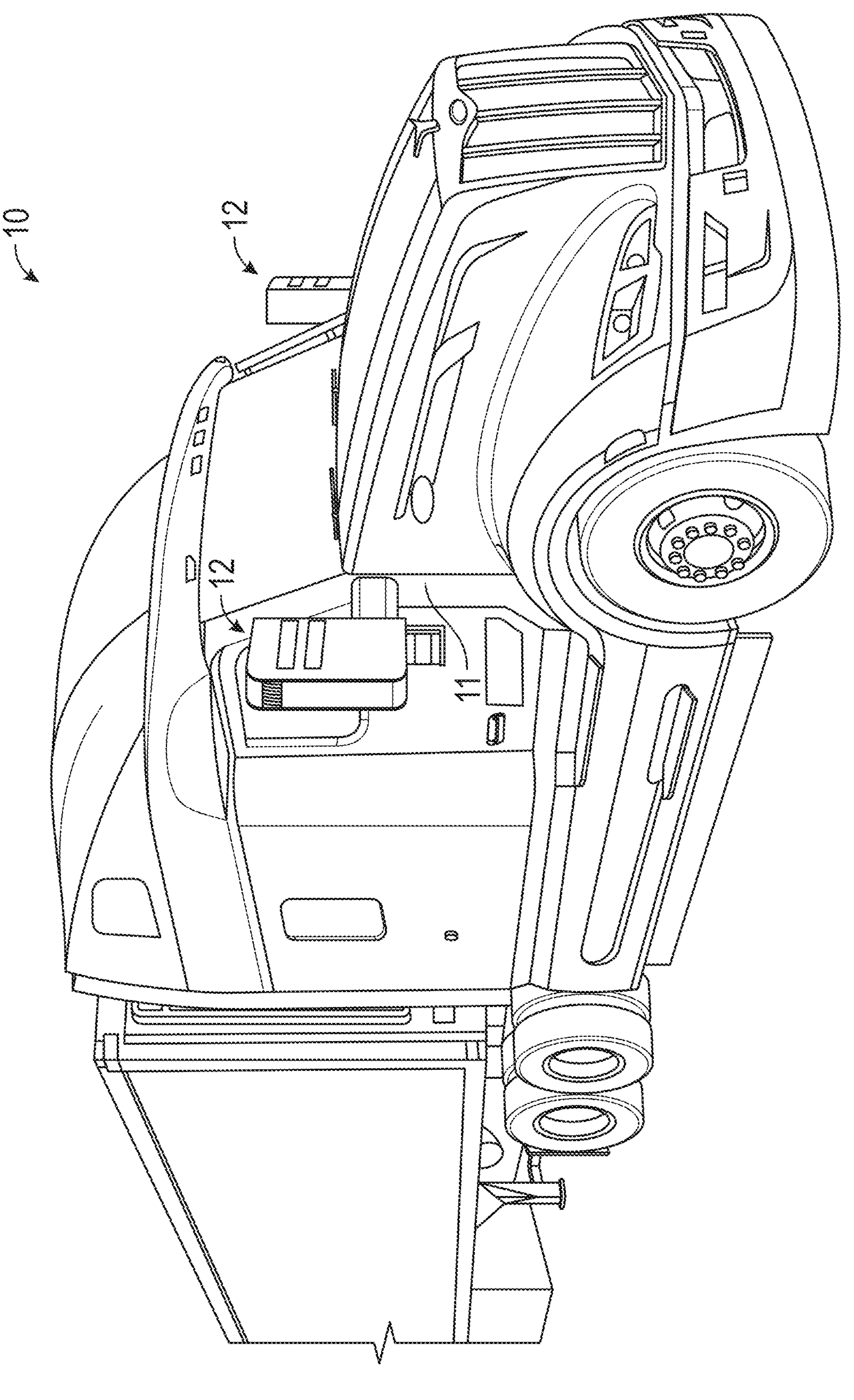
FIG. 2 illustrates a perspective view of a vehicle, according to an embodiment of the present disclosure.

FIGS. 1 and 2 illustrate a vehicle 10 having a sensor pod 12. Although a single sensor pod 12 is illustrated in FIG. 1 and two sensor pods 12 are illustrated in FIG. 2, more or fewer may be provided. The vehicle 10 may be any motor vehicle, such as, for example, but not limited to a car, a truck, a commercial truck, a bus, a watercraft (e.g., boat, ship, underwater vehicles, etc.), a motorcycle, an aircraft (e.g., airplane, helicopter, etc.), or a spacecraft. For ease of description, the vehicle 10 may be referred to herein as a truck 10.

With continued reference to FIGS. 1 and 2, the sensor pod 12 may be a side mirror assembly mounted to the vehicle 10. The sensor pod 12 may assist in navigation of the vehicle 10. In some examples, the sensor pod 12 may assist in navigation in a manner that results in the vehicle 10 being an autonomous or self-driving vehicle. In this regard, the sensor pod 12 may include, for example, but not limited to, one or more cameras, one or more lidars, one or more radars, one or more inertial measurement units, one or more mirrors, one or more of any sensor type that may be useful for the operation of the vehicle, or any combination thereof. The vehicle 10 may use (via a processor or controller) data collected by the sensor pod 12 to navigate the vehicle 10 and to control the speed, direction, braking, and other functions of the vehicle 10. By way of example, the sensor pod 12 may be the sensor pod described in International Patent Application No. WO 2020/180707, herein incorporated by reference in its entirety. Although illustrated as mounted to the A-pillar 11 of the frame of the vehicle 10 near the driver side and passenger side doors, the sensor pod 12 may be mounted to other locations on the vehicle 10, such as, for example, but not limited to, driver side and/or passenger side doors or other locations on the frame of the vehicle 10. The mounting site of the sensor pod 12 may preferably use existing mounting points for the truck 10, or may mount with appropriate hardware to the truck structure.

Figure 3:
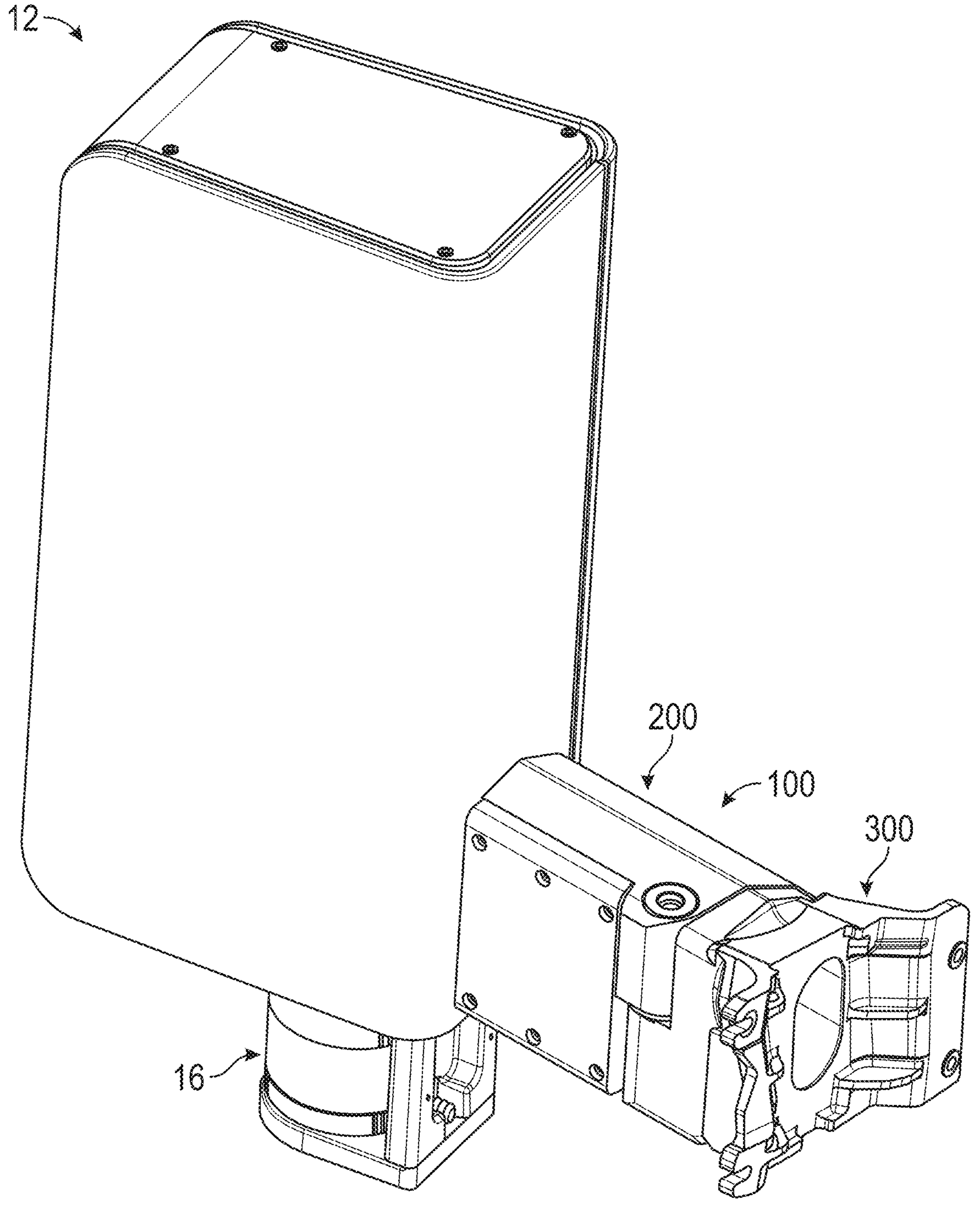
FIG. 3 illustrates a perspective view of a sensor pod with a connecting assembly, according to an embodiment of the present disclosure.

FIG. 3 illustrates the sensor pod 12 and a connecting assembly 100. The vehicle 10 is omitted for clarity. The connecting assembly 100 may mount or couple the sensor pod 12 to the vehicle 10 (FIG. 1). The connecting assembly 100, generally, may include a sensor pod arm 200 and a bracket 300. The sensor pod arm 200 may connect to the sensor pod 12 and the bracket. The bracket 300 may connect to the vehicle 10. The bracket 300 may connect to the sensor pod arm 200 in a manner to be described herein. The bracket 300 may connect the vehicle 10 (FIG. 1) to the sensor pod arm 200, and, in turn, to the sensor pod 12.

As mentioned, the sensor pod 12 may take many forms and may include a lidar 16, such as described, for example, in International Patent Application No. WO 2020/180707. The sensor pod 12 is illustrated blank for purposes of description, however, as mentioned, the sensor pod 12 may include mirrors, sensor, and the like. See, for example, FIGS. 13 and 14, which depict an exemplary front surface of the sensor pod 12 having a mirror 13.

Figure 8:
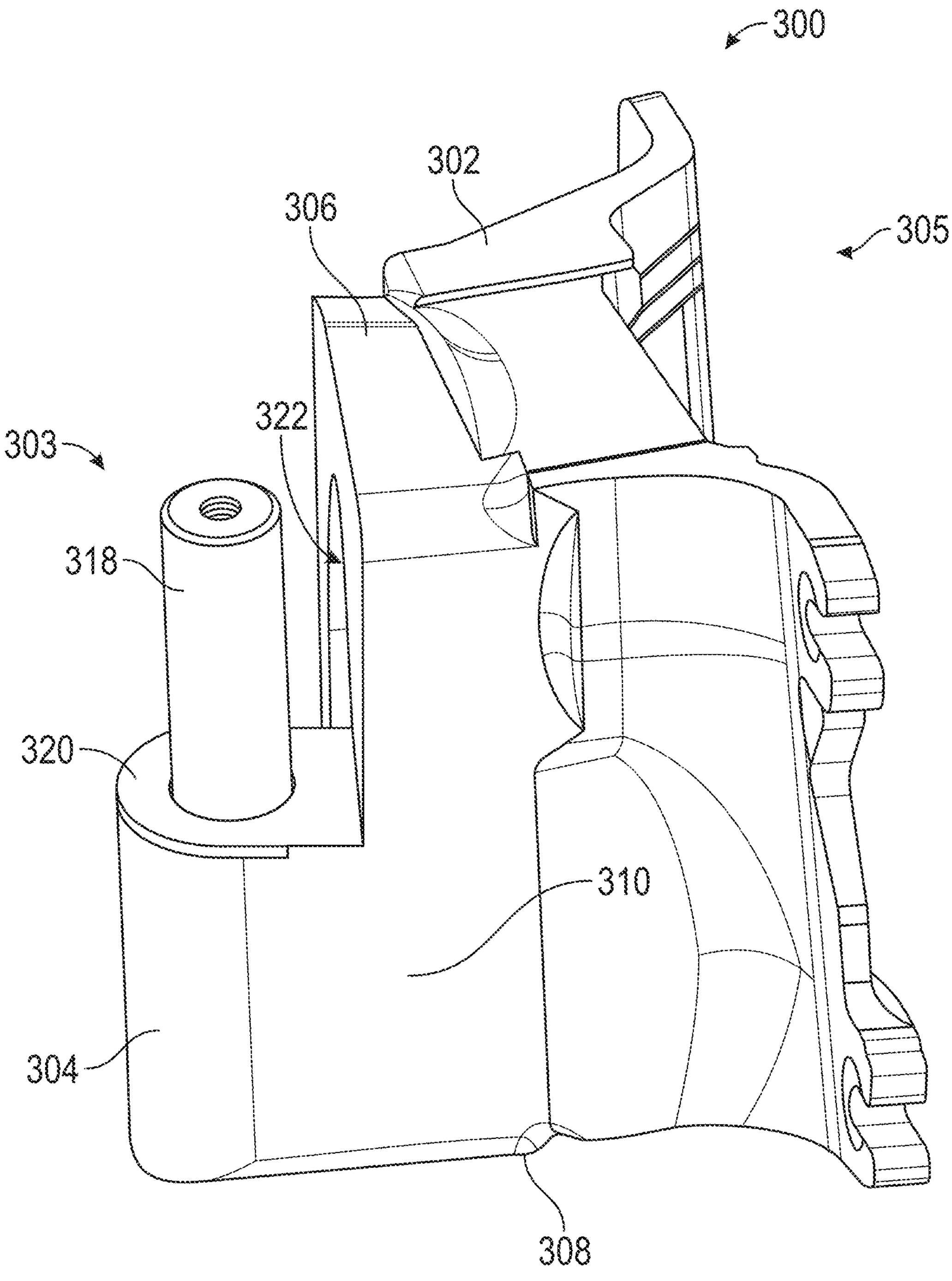
FIG. 8 illustrates a perspective view of the bracket of the connecting assembly of FIG. 3, according to an embodiment of the present disclosure.
Figure 9:
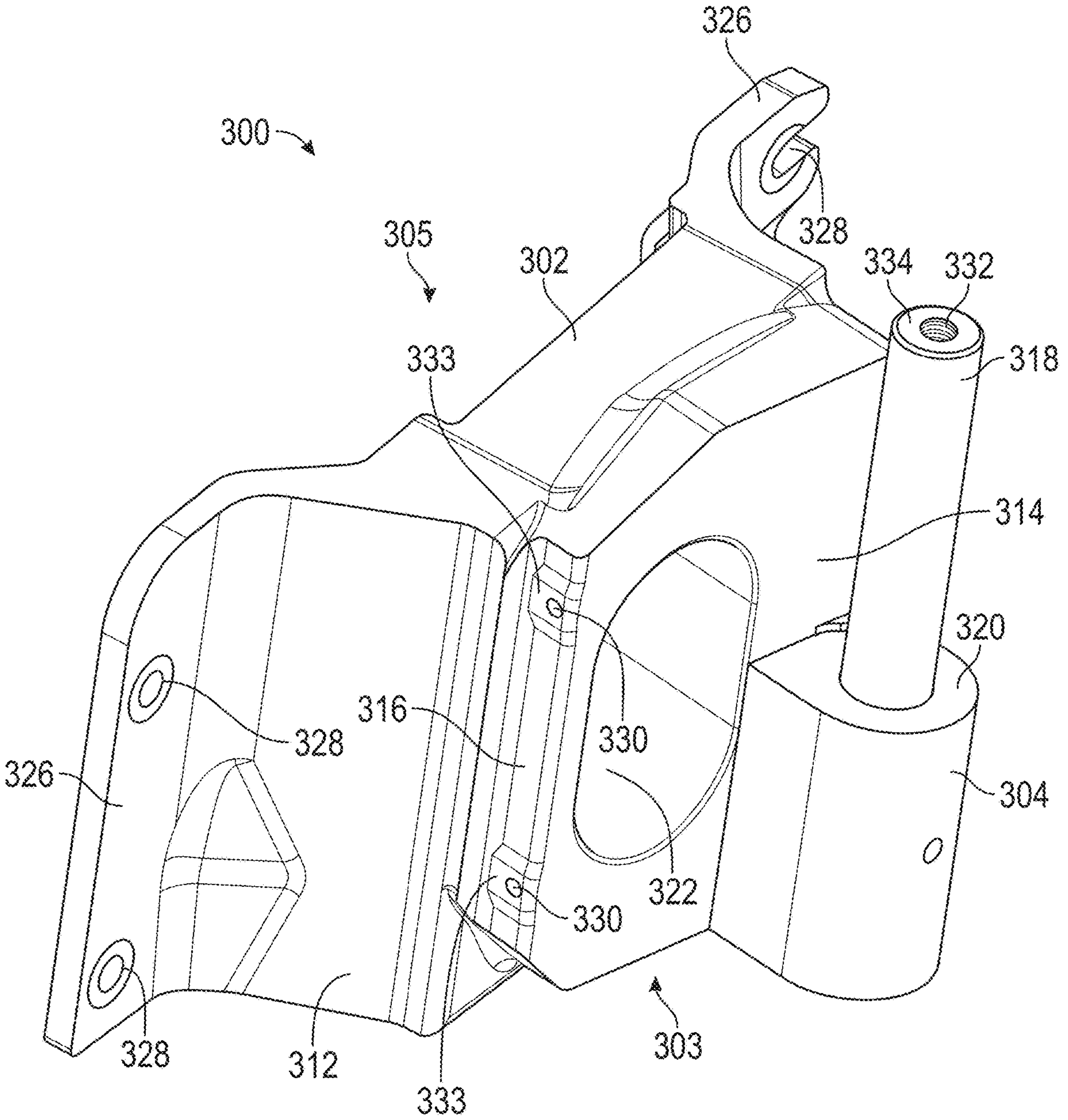
FIG. 9 illustrates another perspective view of the bracket of FIG. 8, according to an embodiment of the present disclosure.
Figure 10:
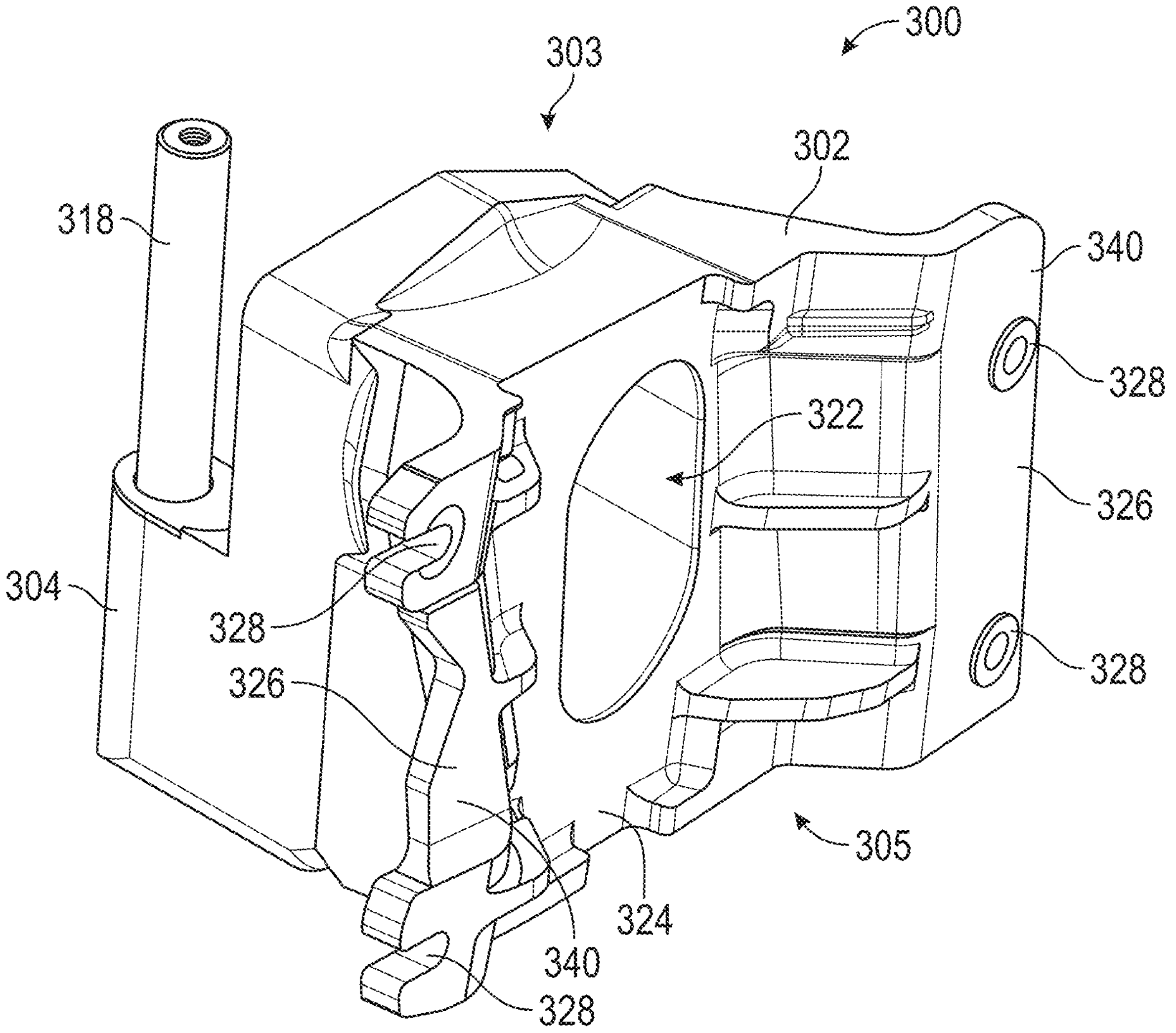
FIG. 10 illustrates another perspective view of the bracket of FIG. 8, according to an embodiment of the present disclosure.

The details of the sensor pod arm 200 and the bracket 300 are described in detail with reference to FIGS. 4 to 10. FIGS. 4 to 7 illustrate the sensor pod arm 200 with the bracket 300 removed for purposes of description. FIGS. 8 to 10 illustrate the bracket 300 alone, also for purposes of description.

Referring to FIGS. 4 to 7, the sensor pod 12 with the sensor pod arm 200 are illustrated. The sensor pod arm 200 includes a sensor pod arm body 202. The sensor pod arm body 202 has one end 203 connected to the bracket 300 (FIG. 3), which is not shown in these figures to view and describe the details of the sensor pod arm 200. The sensor pod arm body 202 has another end 205 connected to the sensor pod 12 at a sensor pod housing 14. In some examples, the connection between the housing 14 of the sensor pod 12 and the sensor pod arm body 202 may be a permanent connection such that the sensor pod arm body 202 and the housing 14 of the sensor pod 12 may be integral, unitary, or formed as a single unit. In some examples, the connection between the housing 14 and the sensor pod arm body 202 may be removable. In some examples, the housing 14 and the sensor pod arm body 202 are connected with adhesive, welding, fasteners, or are formed together through casting or molding or the like.

Figure 4:
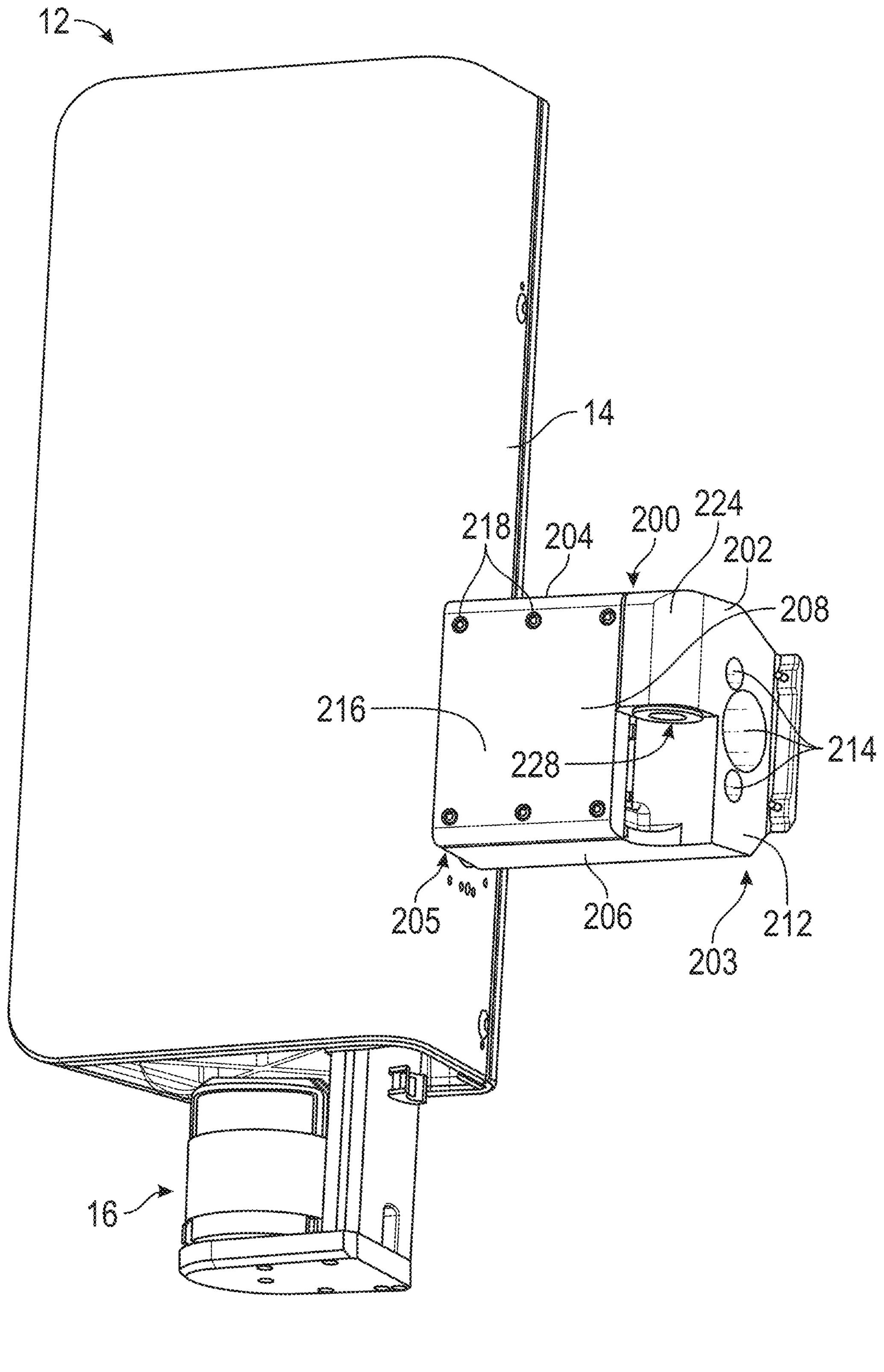
FIG. 4 illustrates a perspective view of the sensor pod of FIG. 3 with a sensor pod arm of the connecting assembly and without a bracket of the connecting assembly, according to an embodiment of the present disclosure.
Figure 5:
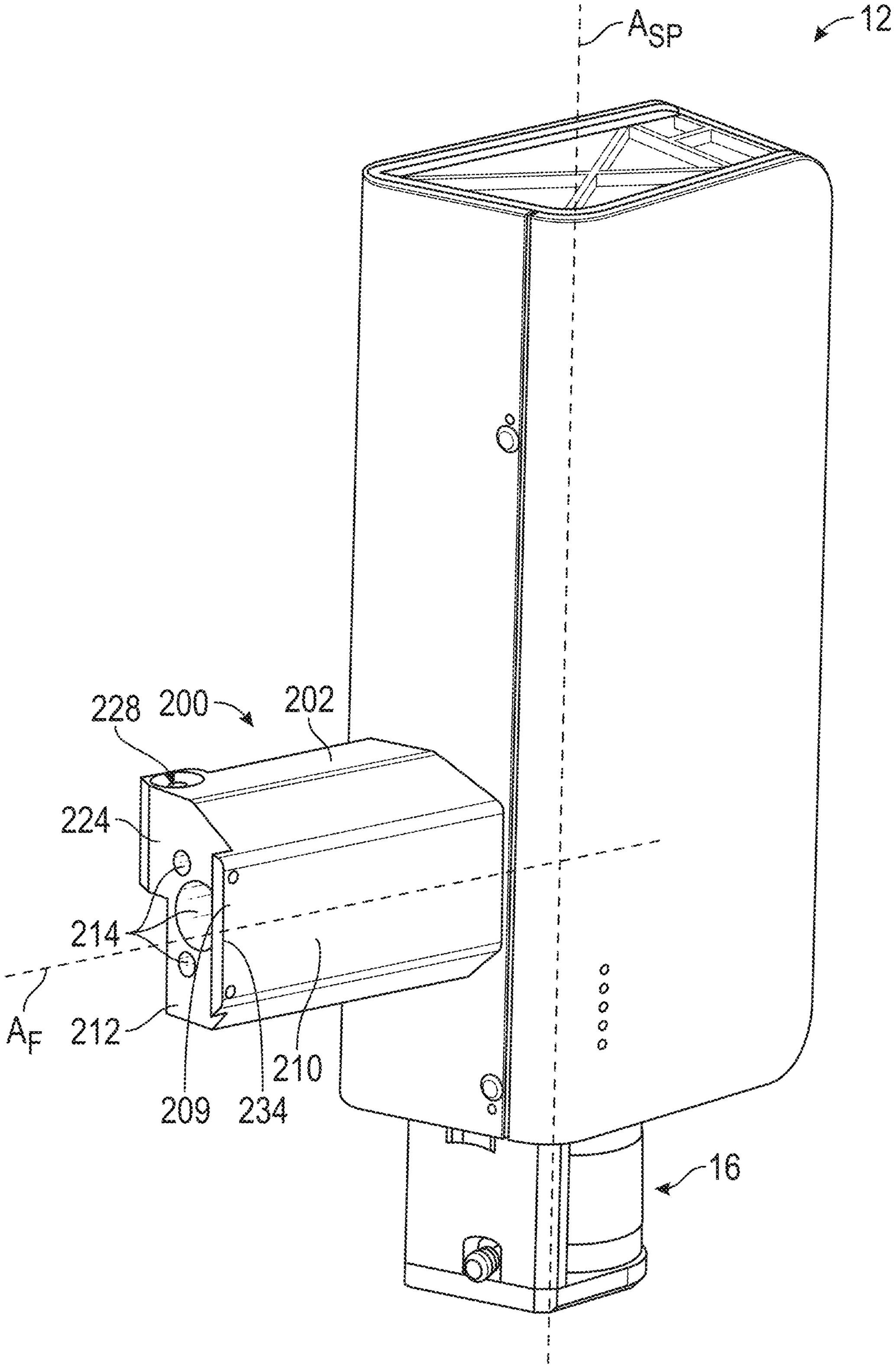
FIG. 5 illustrates another perspective view of the sensor pod of FIG. 4, according to an embodiment of the present disclosure.

Referring to FIGS. 4 and 5, different perspective views of the sensor pod arm 200 are shown and described herein. The sensor pod arm 200 may be generally configured with a housing or sensor pod arm body 202 as illustrated. At the end 203, the sensor pod arm body 202 includes a side surface 212, a sensor pod arm protrusion 224 having an opening 226 therein, and a sensor pod arm flange 234, all for connecting to the bracket 300 (FIG. 3). The interaction of each of the side surface 212, the sensor pod arm protrusion 224, the opening 226, and the sensor pod arm flange 234 with the bracket 300 may couple the sensor pod arm 200 to the bracket 300 in a manner to be described herein.

With continued reference to FIGS. 4 and 5, the sensor pod arm 200 may include an upper side 204, a lower side 206, a first lateral side 208 and a second lateral side 210. The sensor pod arm body 202 includes the side surface 212 that, when coupled to the bracket 300, is aligned with and may be in touching contact a side surface 314 (FIG. 9) of the bracket 300. The side surface 212 may be a planar surface. The side surface 212 may include one or more openings 214, also referred to as one or more ports 214, to allow passage of one or more conduits between the sensor pod 12 and the vehicle 10 (FIG. 1). As seen by briefly referring to FIGS. 6 and 12, the one or more openings 214 extend from the side surface 212 to an opposing side surface 213 of the bracket arm. The side surface 213 defines an inner wall of a cavity 220 in which the one or more conduits are housed. The first lateral side 208 of the sensor pod arm 200 may include a cover 216 that is removably coupled to the sensor pod arm body 202. The cover 216 may allow access to one or more conduits (not visible in FIG. 4) passed through the one or more openings 214. The cover 216 may be coupled to the sensor pod arm body 202 with one or more fasteners 218, although other removable securing means are contemplated.

Figure 6:
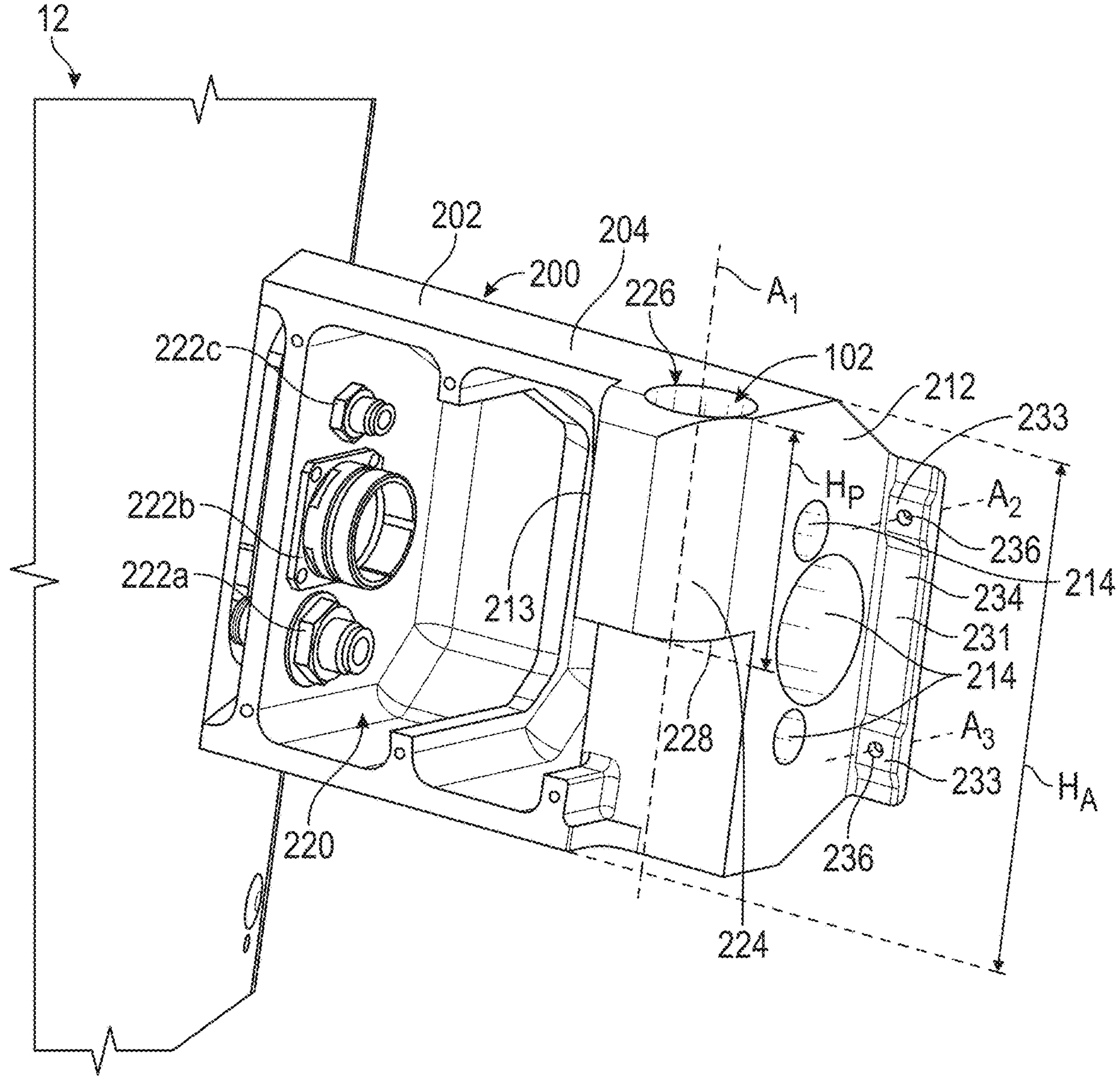
FIG. 6 illustrates a perspective view of the sensor pod arm of the sensor pod of FIG. 4 with a cover removed, according to an embodiment of the present disclosure.
Figure 7:
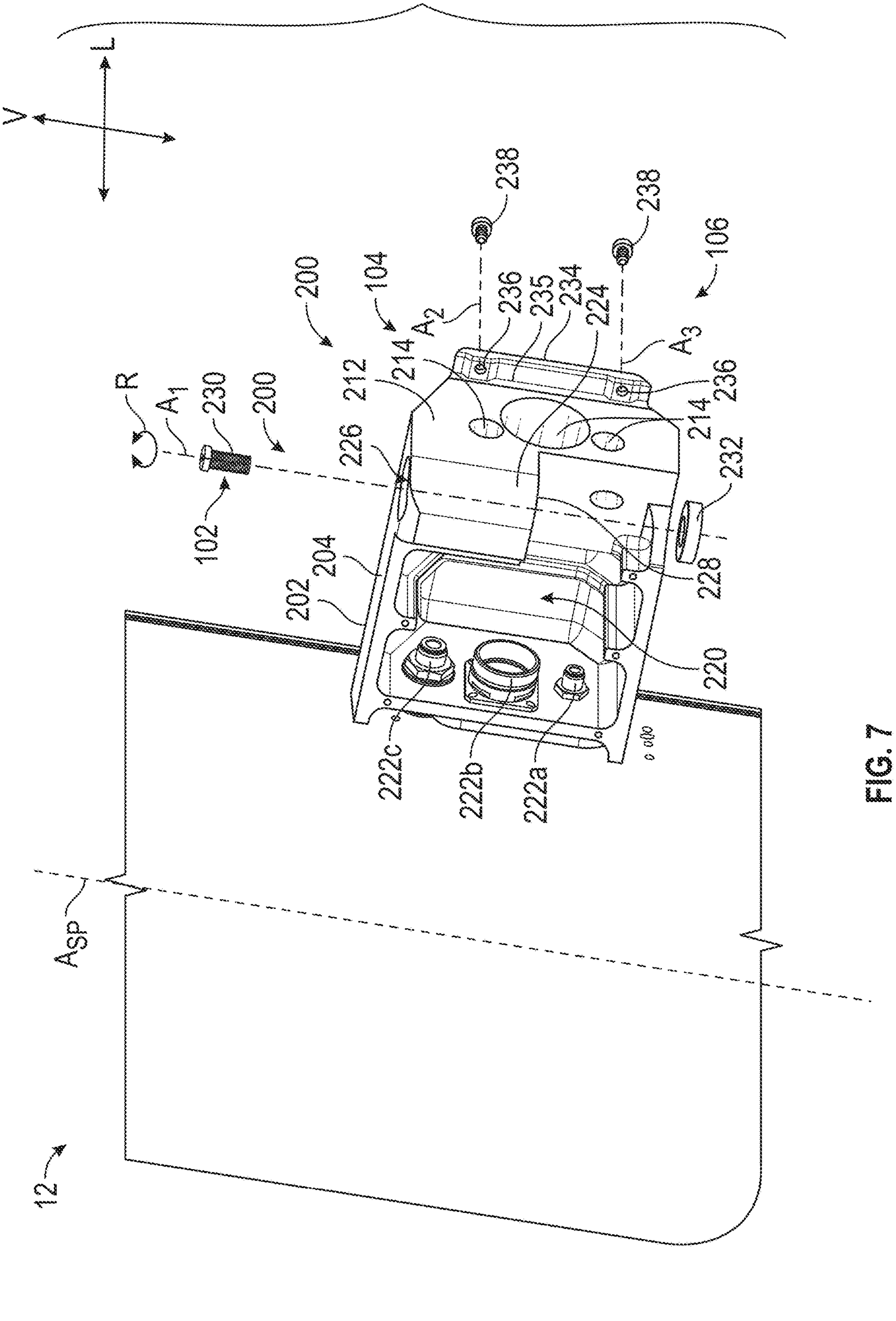
FIG. 7 illustrates a perspective, exploded view of the sensor pod arm of FIG. 6, according to an embodiment of the present disclosure.

Referring to FIGS. 6 and 7, the sensor pod arm 200 is illustrated with the cover 216 (FIG. 4) omitted for clarity. The sensor pod arm body 202 may include a cavity 220. As mentioned previously, one or more conduits (omitted for clarity) may extend within the cavity 220. The one or more conduits may bring power, water, air, data, electricity, other fluids, or the like from the vehicle 10 (FIG. 1), through the connecting assembly 100 (e.g., through the bracket 300 and the sensor pod arm 200) and to the sensor pod 12. The one or more conduits may allow the sensor pod 12 to receive and transmit (e.g., may have two-way communication) data, power, information, signals (e.g., control signals) with the vehicle 10. Cleaning fluids, such as water and air, may also be provided to the sensor pod 12 for cleaning the sensors housed within.

With continued reference to FIGS. 6 and 7, the one or more conduits (omitted for clarity) may extend from the side surface 212, through the one or more openings 214 and into the cavity 220 for coupling with one or more conduit connectors, here shown as a first conduit connector **222*a*, a second conduit connector 222*b*, and a third conduit connector 222*c*. Although three conduit connectors are shown, more or fewer may be provided. The one or more conduits and the one or more conduit connectors may permit power or electrical conduits, signal conduits, water conduits, air conduits, and other fluid conduits to be coupled between the vehicle 10 (FIG. 1) and the sensor pod 12, for reasons discussed above. In some examples, the first conduit connector 222*a* may couple an air conduit to the sensor pod 12, the second conduit connector 222*b* may couple a power and/or signal conduit to the sensor pod 12, and the third conduit connector 222*c* may couple a water conduit to the sensor pod 12. The air and water conduits may permit cleaning of the sensors within the sensor pod 12. The power and signal conduit may permit power to be supplied to the sensor pod 12 and may permit two-way communication between one or more computers or processors on the vehicle 10 (FIG. 1) and the sensor pod 12. That is, the sensor pod 12 may transmit and receive data, control signals, power, or the like from the vehicle 10 (FIG. 1**) and vice versa.

With continued reference to reference to FIGS. 6 and 7, the sensor pod arm body 202 may include a sensor pod arm protrusion 224 extending downward from the upper side 204. As illustrated, the sensor pod arm protrusion 224, and thus an opening 226 extending therethrough, extends about halfway along a sensor pod arm height $H_A$ between the upper side 204 and lower side 206 and ends about at a midpoint area at a lower surface 228. Although the protrusion 224 and the opening 226 are shown and described as having a height $H_P$ spanning about fifty percent of the sensor pod arm height $H_A$, other heights $H_P$ are contemplated. For example, the height $H_P$ may be between about thirty percent and about seventy percent of the height $H_A$. The opening 226 of the sensor pod arm protrusion 224 receives a bracket pin 318 (FIG. 9). The bracket pin 318 may be referred to herein as a pin or a post. Although shown and described as a cylindrical component, the opening 226 may take any shape that is configured to mate with a respective shape of the bracket pin 318 and allow relative rotation thereof. The opening 226 may be referred to as a pin receiving opening 226. The opening 226 may extend through the sensor pod arm protrusion 224 from the upper side 204 to the lower surface 228 of the sensor pod arm protrusion 224. A fastener 230 and a thrust bearing 232 are provided to secure the bracket pin 318 (FIG. 9), and thus, the bracket 300 (FIG. 3) to the sensor pod arm 200. The thrust bearing 232 is included to allow relative rotation between the sensor pod arm 200 and the bracket 300 while also supporting the axial load caused by the weight of the sensor pod 12, as discussed in more detail to follow.

The sensor pod arm body 202 may include a sensor pod arm flange 234 extending laterally past the side surface 212 and having a side 209 (FIG. 5) coextensive with the second lateral side 210 (FIG. 5). As shown in FIG. 5, a flange axis $A_F$ extending coextensive with the second lateral side 210 may be perpendicular to the longitudinal axis $A_{SP}$ of the sensor pod 12. Referring again to FIGS. 6 and 7, the sensor pod arm flange 234 may include one or more raised portions 233 that extend laterally from a flange surface 231 toward the one or more openings 214 and/or protrusion 224. Each of the one or more raised portions 233 may have a planar face configured to contact a surface of the bracket 300. Each of the one or more raised portions 233 may include an opening 236 for receiving respective fasteners 238. When assembled, the raised portions 233 may be in touching contact with the raised portions 333 (FIG. 9) of the bracket 300. The one or more fasteners 238 may extend through the one or more openings 236 to secure the sensor pod arm flange 234 to the bracket 300 (FIG. 3) at one or more openings 330 (FIG. 9) in a manner to be described herein.

Referring to FIGS. 6 and 7, the connecting assembly 100, of which the sensor pod arm 200 is a component, includes a first connection 102 along a first axis $A_1$. The first axis $A_1$ may be parallel with and offset from a vertical axis $A_{SP}$ of the sensor pod 12. The connecting assembly 100 includes a second connection 104 along a second axis $A_2$, the second axis $A_2$ being perpendicular with the vertical axis $A_{SP}$. The connecting assembly 100 includes a third connection 106 along a third axis $A_3$, the third axis $A_3$ being perpendicular with the vertical axis $A_{SP}$ and parallel with the second axis $A_2$. The flange axis $A_F$ may be perpendicular to each of the first axis $A_1$, the second axis $A_2$, and the third axis $A_3$.

The first connection 102, the second connection 104, and the third connection 106 provide an anti-vibration system for the sensor pod 12. That is, the first connection 102, the second connection 104, and the third connection 106 connect the sensor pod 12 to the vehicle 10 in a manner that prevents or limits relative movement between the sensor pod 12 and the vehicle 10. As used herein, the terms “fix”, “fixate”, “fixed”, “rigid”, “rigidly” or the like refer to such a connection where relative movement is prevented or limited between two parts.

Accordingly, the first connection 102 fixates the sensor pod 12 about the first axis $A_1$ to provide a first fixation point. The first fixation point limits movement between the sensor pod arm 200 and the bracket 300 in both a vertical direction V (due to the securing of the fastener 230 to the bracket pin 318) and in a lateral direction L (due to the interaction between the bracket pin 318 and the opening 226). The second connection 104 fixates the sensor pod 12 about the second axis $A_2$ to provide a second fixation point and the third connection 106 fixates the sensor pod 12 about the third axis $A_3$ to provide a third fixation point. Each of the second connection 104 and the third connection 106 limit movement between the sensor pod arm 200 and the bracket 300 in the rotational direction R about the first axis $A_1$. Thus, the first fixation point, the second fixation, and the third fixation point create a rigid connection between the sensor pod arm 200 and the bracket 300 to prevent or limit relative movement in all directions between the sensor pod arm 200 and the bracket 300. Although three fixation points are illustrated and described, only two fixation points are required: the first fixation point and a second fixation point spaced apart from the first axis $A_1$ (e.g., the second connection 104 or the third connection 106). Thus, the second fixation point may occur at either of the fasteners 238 extending through the opening 236 and the opening 330 or may occur at other locations spaced apart from the first axis $A_1$ such that the second fixation point creates a moment through the fastening force between the arm 200 and the bracket 300 that counteracts any rotation of the sensor pod 12 about the first Axis $A_1$. The placement of the second fixation point may preferably be perpendicular to the Axis $A_1$ so that the predetermined loads for shear (as described below) may be along the axis of the second fixation point. The second fixation point may also be along an axis that has a perpendicular component to the first Axis $A_1$. Thus, the second connection 104 or the third connection 106 may be optional and may be omitted. In some examples, a single fastener 238, a single opening 236, and a single opening 330 may be provided. In some examples, more than two fasteners 238, more than two openings 236, and more than two openings 330 may be provided such that more than two fixation points are provided about the rotational direction R.

The first fixation point, the second fixation point, and the third fixation point, refer to locations of fixation, but do not limit fixation to a single, finite point. As described previously, these fixation points are with respect to axes. The aforementioned fixation points prevent, limit, and/or reduce vibration of the sensor pod 12 since the sensor pod 12 is now rigidly connected to the vehicle 10 (e.g., rigid as in there is little, minimal or no relative movement between the sensor pod 12 and the vehicle 10). The rigidness resulting from the limiting or preventing of relative movement provides an anti-vibration system for the sensor pod 12 which, may reduce, limit, or prevent the negative impacts that vibration may cause on the sensor and/or the calibration of the sensors.

FIGS. 8 to 10 illustrate the bracket 300. The bracket 300 is part of the connecting assembly 100 as discussed above. One end 303 of the bracket 300 may connect with the sensor pod arm 200 of the connecting assembly 100 (e.g., at the end 203), which thereby connects to the housing 14. Another end 305 of the bracket 300 may connect to the vehicle 10 (FIG. 1). The bracket 300 includes a bracket body 302 having a bracket protrusion 304 as shown in FIG. 8. The bracket 300 includes an upper side 306, a lower side 308, a first lateral side 310 and a second lateral side 312 (FIG. 9). Referring now to FIGS. 8 and 9, the bracket body 302 includes the side surface 314 that, when assembled, aligns with and may be in touching contact with the side surface 212 (FIG. 4). As discussed above, the bracket body 302 includes one or more raised portions 333. Each of the one or more raised portions 333 may be in touching contact with a respective raised portion 233 of the sensor pod arm 200. The bracket protrusion 304 extends from the side surface 314.

As shown in FIGS. 8 and 9, a bracket pin 318 extends vertically upward from an upper surface 320 of the bracket protrusion 304. The bracket pin 318 is formed of a material having a strength and durability to support the load of the sensor pod arm 200 and the sensor pod 12 and to avoid or reduce pitting or scratching on the bracket pin 318 that may otherwise inhibit rotation of the assembly about the bracket pin 318. In some examples, the bracket pin 318 may, thus, be formed of a different material than the bracket 300, where the material of the bracket pin 318 is harder than the material of the bracket 300. In some examples, the bracket pin 318 may be formed unitarily or integrally with the bracket protrusion 304. In some examples, to facilitate manufacturing the bracket pin 318 of a different material, the bracket pin 318 may be formed separately and coupled to the bracket 300, such as shown and described with respect to FIG. 11.

An opening 322, also referred to as a port 322, extends through the bracket 300. The opening 322 may extend from the side surface 314 through the bracket body 302 to an opposing surface 324, which is also referred to as a bracket face 324 (FIG. 10). The opening 322 may align with the one or more openings 226 on the sensor pod arm 200 to allow passage of the one or more conduits from the vehicle 10 (FIG. 1) to the sensor pod 12 (FIG. 1), as discussed previously.

Referring to FIGS. 9 and 10, the bracket body 302 includes one or more flanges 326 for coupling the bracket 300 to an outer surface of the vehicle 10 (FIG. 1) such that an operator may use the sensor pod 12 as a mirror and such that the sensor pod 12 may sense or detect the proper conditions (e.g., weather, road, driving, etc.) to assist in autonomous or guided driving. Each of the one or more flanges 326 includes a surface 340 for contacting the outer surface of the vehicle 10 (FIG. 1). The outer surface of the vehicle 10 may be, for example, but not limited to, a frame, door, or other surface of the vehicle 10. One or more mounting holes 328 may receive fasteners (not depicted) to secure the bracket 300 to the vehicle 10 (FIG. 1). A side surface 316 on the second lateral side 312 of the bracket 300 may include one or more openings 330 that align with the one or more openings 236 on the sensor pod arm flange 234 (FIG. 7). The one or more fasteners 238 (FIG. 7) extend through the one or more openings 236 and then through the one or more openings 330 to secure the sensor pod arm 200 to the bracket 300. The one or more fasteners 238 may be threaded and screwed or tightened within the one or more openings 330 in a known manner. As mentioned previously, the one or more fasteners 238 extending through the one or more openings 236 and the one or more openings 330 fix the bracket 300 to the sensor pod arm 200 as the second connection 104 (FIG. 7) and the third connection 106 (FIG. 7). The bracket pin 318 is received in the opening 226 of the sensor pod arm 200. A threaded opening 332 is provided in an upper surface 334 of the bracket pin 318. The fastener 230 (FIG. 7) is received in the threaded opening 332 to secure the sensor pod arm 200 to the bracket 300 and is the first connection 102 (FIG. 7).

The bracket pin 318 provides a support axle extending from the bracket 300. The length of the support axle (e.g., the length of the bracket pin 318) and the depth of the respective opening 226 are sized (e.g., sized in length and diameter) to counteract the moment created by the weight of the sensor pod 12. This may allow for the sensor pod 12 to be easily, quickly, and efficiently installed and uninstalled. In some examples, this may be possible by a single operator. This is due to the load bearing hook that the bracket pin 318 provides, allowing a single person to lower the sensor pod 12 onto the bracket pin 318 which is already secured to the vehicle 10.

Referring to FIGS. 9 and 10, the bracket 300 is illustrated with four fixation points, one at each of the fasteners extending through the respective openings 328. That is, each fixation point extends perpendicular to the planar surface 340. When affixing the planar surface 340 of the bracket 300 to the vehicle 10, however, only three fixation points are required to prevent lateral translation, vertical translation, and forward translation, and to further fix all three rotational axes. That is, three fixation points are required to limit or prevent movement of the bracket relative to the truck. The three fixation points are not collinear. At least two of the three fixation points are coplanar. Accordingly, although four openings 328 are illustrated, only three are required. For example, a first fixation point in the upper left opening 328 of FIG. 9 will secure the bracket 300 to the vehicle 10 to limit or prevent lateral movement and vertical movement. If no other fixation points were provided, the bracket would be allowed to rotate around the first fixation point. Thus, a second fixation point in the upper right opening may be provided. As may be appreciated, this prevents the rotation of the bracket 300 about the first fixation point, however, the bracket 300 may flex or rotate about the axis extending through the first two fixation points. Therefore, a third fixation point in one of the lower openings is added to prevent this relative movement. These three fixation points are exemplary, and it may be appreciated that two lower fixation points and one upper fixation point may be provided, or any other combination of three points such that the three points are not collinear. The fourth fixation point, through the fourth opening 328 may be redundant and may provide added fixation of the bracket 300 to the vehicle 10.

Figure 11:
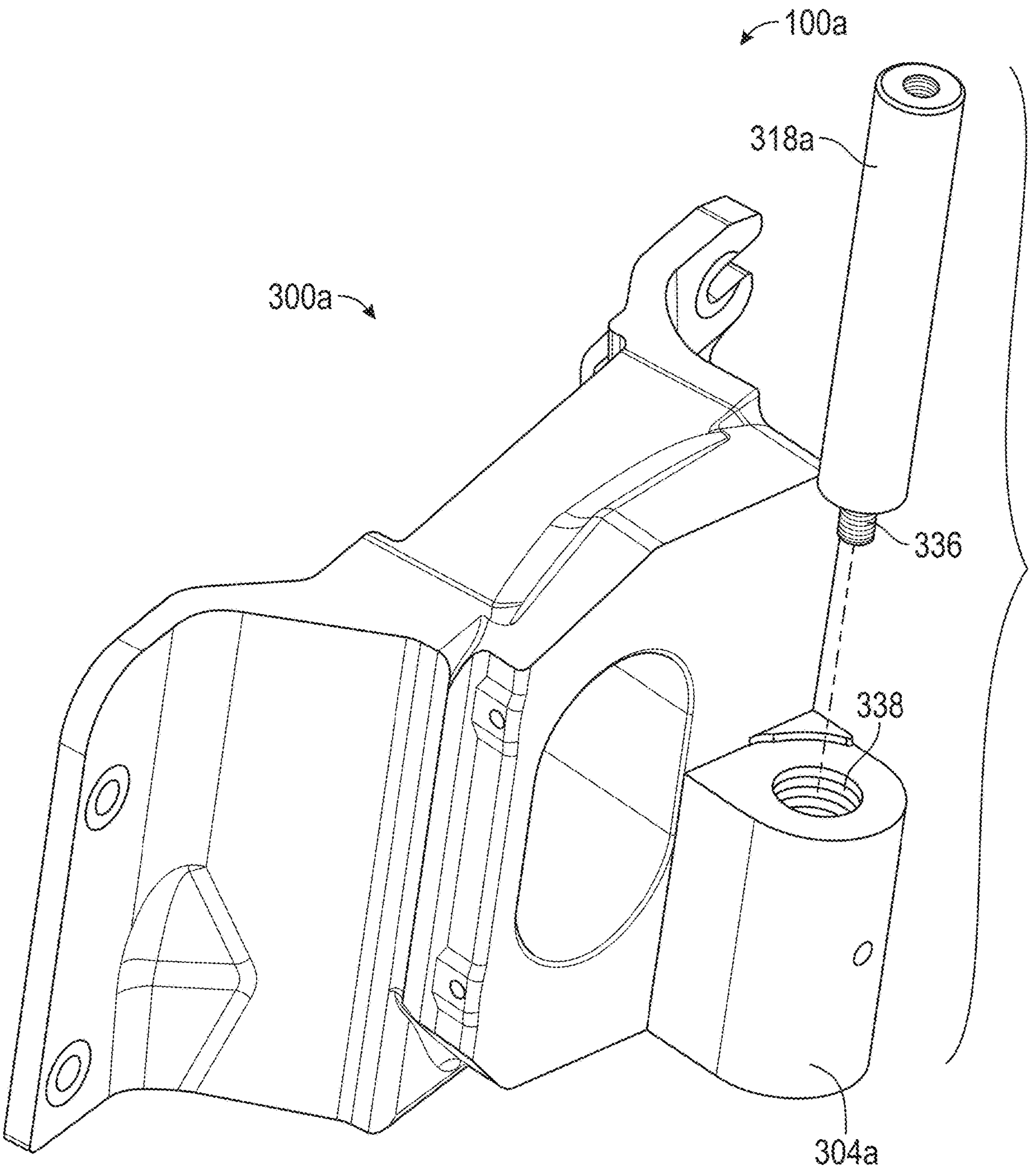
FIG. 11 illustrates an alternative bracket for use with the sensor pod arm of FIG. 6 to form an alternative connecting assembly, according to an embodiment of the present disclosure.

FIG. 11 illustrates an alternative bracket 300*a* for an alternative connecting assembly 100*a*. The bracket 300*a* may be the same as or similar to the bracket 300, and thus like illustrated parts are not redescribed herein, but are understood to be the same as described with respect to bracket 300. In the example of the bracket 300*a*, the bracket pin 318*a* is removably or detachably connected to the bracket protrusion 304*a*. Such a detachable connection may be a threaded pin 336 on the bracket pin 318*a* that is received within a threaded opening 338 on the bracket protrusion 304*a*, although other removable connections are contemplated.

Figure 12:
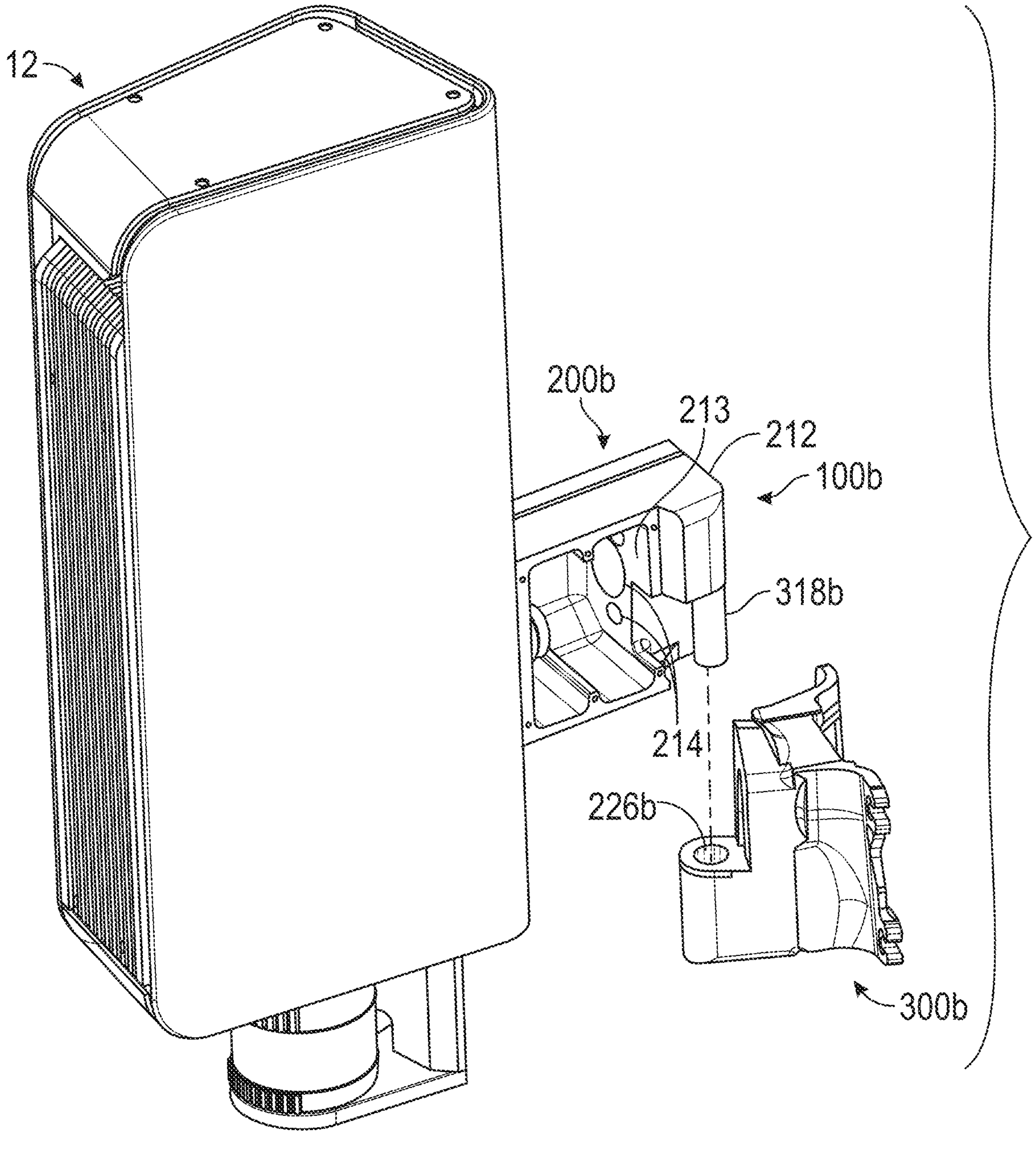
FIG. 12 illustrates a perspective, exploded view of an alternative connecting assembly for use with the sensor pod of FIG. 1, according to an embodiment of the present disclosure.

FIG. 12 illustrates an alternative connecting assembly 100*b*. The connecting assembly 100*b* may be the same as or similar to the connecting assembly 100. In the example of the connecting assembly 100*b*, the pin 318*b* may be reversed as compared to the examples of FIGS. 4 to 11 such that the pin 318*b* may extend from the sensor pod arm 200*b* (as opposed to the bracket as in FIGS. 4 to 11) to be received within an opening 226*b* on the bracket 300*b*. A fastener (not depicted, but similar to or the same as the fastener 230) may be inserted through the opening 226*b* and thread into the pin 318*b* in the same manner previously described to secure the sensor pod arm 200*b* to the bracket 300*b*.

Figure 13:
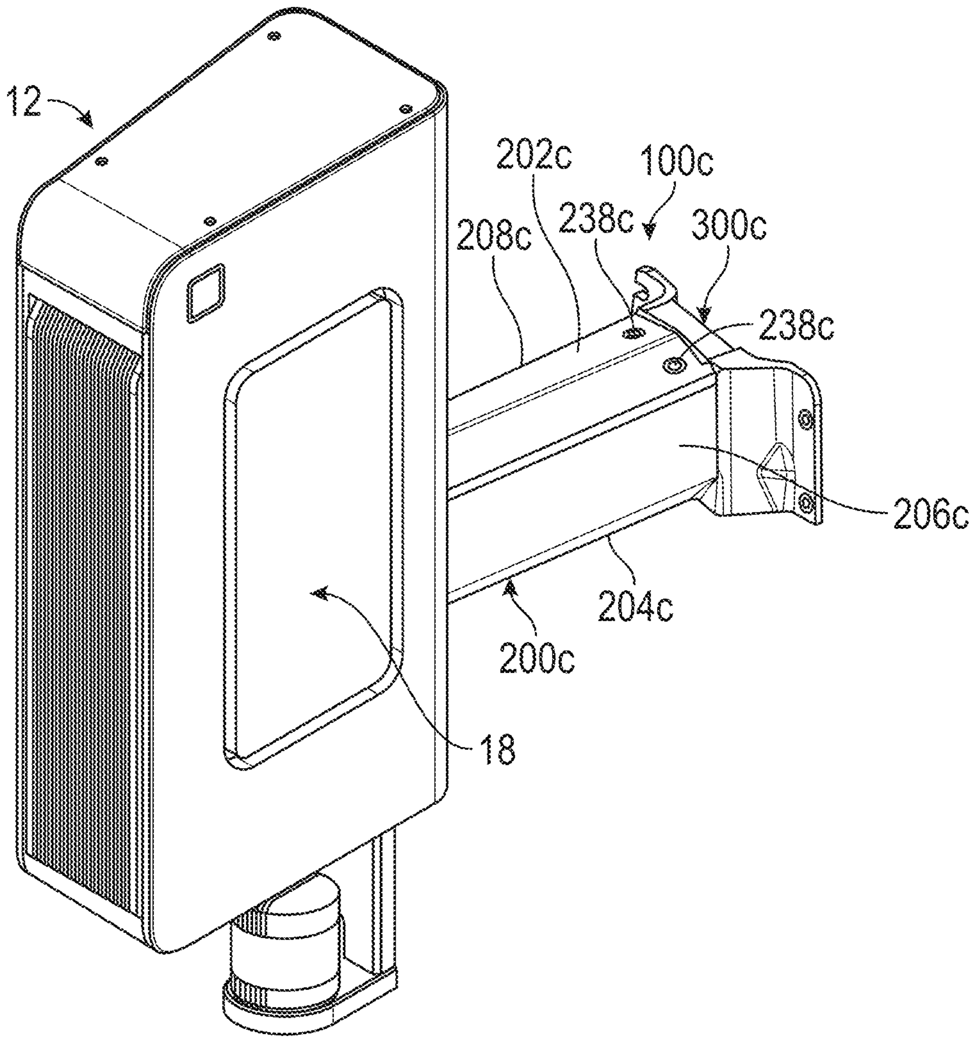
FIG. 13 illustrates a perspective view of an alternative connecting assembly for use with the sensor pod of FIG. 1, according to an embodiment of the present disclosure.

FIG. 13 illustrates an alternative connecting assembly 100*c*. The connecting assembly 100*c* may be similar to the connecting assembly 100. That is, weaker materials or construction as described herein may be used in combination with any of the embodiments described and illustrated in this application. In the example of the connecting assembly 100*c*, the sensor pod arm 200*c* is connected to the bracket 300*c*, such as, for example, with one or more fasteners 238*c* through an upper side 202*c* of the sensor pod arm 200*c*. In one example, a plate of the sensor pod arm may slide over a plate of the bracket. The one or more fasteners 238*c* may then be secured in respective openings in the plates to secure the sensor pod arm plate to the bracket plate, thus securing the sensor pod arm to the bracket. Although not visible in FIG. 13, the connecting assembly 100*c* may include a quick swap connection, similar to the support axle of the prior embodiment. That is, the bracket may include a feature extending therefrom that is capable of supporting the weight of the sensor pod 12 during installation thereof on a vehicle, but before securing with the fasteners 238*c*. Accordingly, a single operator may install the sensor pod 12 and the sensor pod arm 200*c* on the bracket 300*c*.

The sensor pod arm 200*c* may have the upper side 202*c* and a lower side 204*c* formed to be weaker than a first lateral side 206*c* and a second lateral side 208*c*. The weaker sides form a crumple zone that allows the upper side 202*c* and the lower side 204*c* to fail, break, deteriorate, or bend, or combinations thereof, before the forward side 206*c* and the second lateral side 208*c*. The weaker upper side 202*c* and lower side 204*c* may be achieved through manufacturing, such as, for example, but limited to, weaker materials, machined or manufactured weak points, machined, or manufactured crumple zones, or combinations thereof. Weaker materials as described herein may be used in combination with any of the embodiments described and illustrated in this application.

Figure 14:
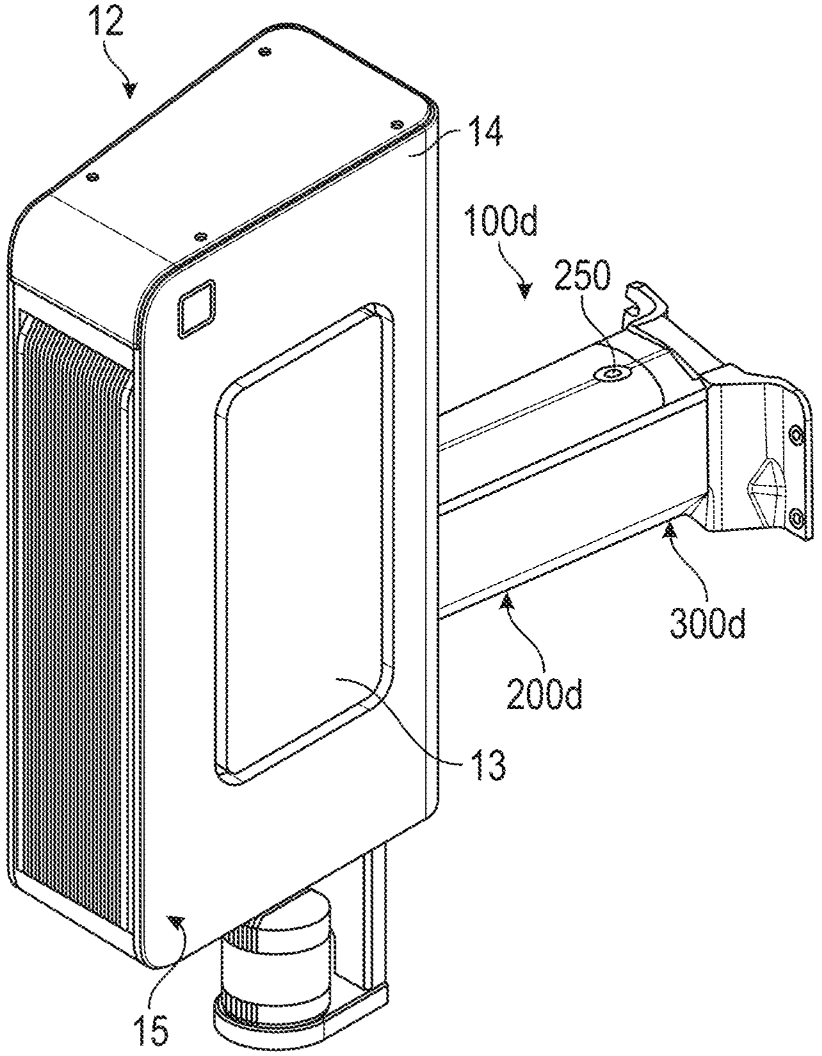
FIG. 14 illustrates a perspective view of an alternative connecting assembly for use with the sensor pod of FIG. 1, according to an embodiment of the present disclosure.

FIG. 14 illustrates an alternative connecting assembly 100*d*. The connecting assembly 100*d* may be the same as or similar to the connecting assembly 100. In the example of the connecting assembly 100*d*, the sensor pod arm 200*d* is rotationally coupled to the bracket 300*d*. For example, a rotational joint 250 may couple the sensor pod arm 200*d* to the bracket 300*d*. The rotational joint 250 may be any known rotational connection, such as a rotational connection employed in conventional side-view mirrors. For example, friction and a spring (not depicted) prevent the rotational joint 250 from rotating such that the connecting assembly 100*d* is prevented from relative rotation between the sensor pod 12 and the vehicle 10 (FIG. 1) until a force is provided to counteract the spring to allow such relative movement. The rotational joint 250 may be provided in addition to a quick swap feature, such as described with respect to any foregoing embodiment. As mentioned, the quick swap feature may allow the bracket to support the weight of the sensor pod 12 during installation thereof on a vehicle.

As shown in FIGS. 13 and 14, the sensor pod 12 may also include a mirror. Likewise, any of the embodiments of sensor pod 12 described with respect to FIGS. 1 to 12 may include a mirror. When the sensor pod 12 is replacing a traditional side mirror, a mirror, such as mirror 13, may be installed on the sensor pod 12 to allow a driver a traditional side view mirror. The sensor pod 12 may also provide video feeds from camera sensors (not depicted) that project a rear-facing view either onto the sensor pod surface (e.g., surface 15 of the housing 14), or into the truck cab to provide a similar rear-view prospective for a driver.

Any of the aforementioned connecting assemblies, or portions thereof, may be combined with other connecting assemblies without departing from the scope of the present disclosure.

With the structure of the connecting assembly 100 understood, installation, operation, and removal of the connecting assembly 100 is now set forth in FIGS. 15 to 20. Although alternatives to the connecting assembly 100 have been described, for ease of disclosure, the connecting assembly 100 as described in FIGS. 1 to 10 is referenced in FIGS. 15 to 20. However, as previously mentioned, all or parts of the alternative connecting assemblies may be employed in the connecting assembly 100. The process of installation and removal described with respect to FIGS. 15 to 20 is repeatable. That is, the same sensor pod or different sensor pods may be installed and removed a plurality of times using the same process.

To install the sensor pod 12 on the vehicle 10 refers to the method or process of physically connecting the sensor pod 12 to the vehicle 10 by way of the connecting assembly 100 and physically connecting the one or more conduits extending from the vehicle 10 to the sensor pod 12. To uninstall or remove the sensor pod 12 from the vehicle 10 refers to the method or process of physically removing the sensor pod 12 from the vehicle 10 and physically disconnecting the one or more conduits from the sensor pod 12.

Briefly, to install the sensor pod 12 on the vehicle 10, the sensor pod arm 200 is located over the support axle (e.g., bracket pin 318) such that the opening 226 is aligned with the support axle. The sensor pod 12 and the sensor pod arm 200 are then lowered onto the support axle. Once lowered on, the support axle supports the weight of the sensor pod 12 and the sensor pod arm 200 in a manner that prevents the weight of the sensor pod 12 from causing the sensor pod 12 to fall once an operator is no longer supporting the sensor pod 12. The conduits are threaded through the opening 322 and the openings 214 on the connecting assembly 100 to be connected to the connection points. Once the conduits are connected, the sensor pod 12 may be secured to the bracket 300 with the fastener 230 and the fasteners 238. The connecting assembly 100, and in particular the support axle, allows for a single operator to install the sensor pod 12, even given the weight of the sensor pod 12 (e.g., the sensor pod 12 has significant weight due to the sensors and components therein, heavier than a conventional sideview mirror).

Figure 15:
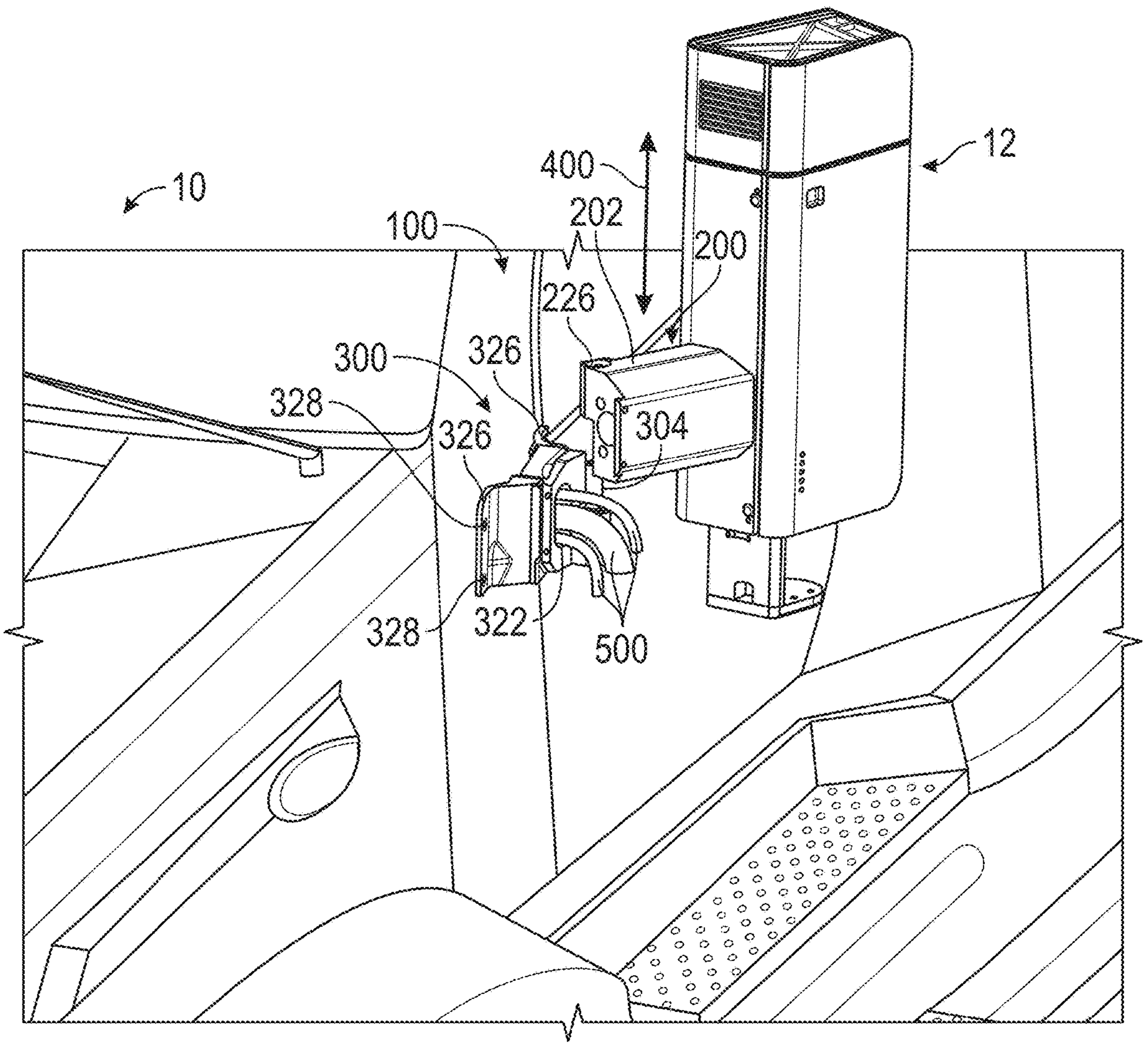
FIG. 15 illustrates an installation step for installing the sensor pod of FIG. 3, according to an embodiment of the present disclosure.

More specifically, to install the sensor pod 12 on a vehicle 10 (FIG. 15; omitted in FIGS. 16 to 20 for clarity), and referring to FIGS. 15 to 20, the bracket 300 is connected to the vehicle 10. Referring first to FIG. 15, the flanges 326 of the bracket 300 are aligned on the vehicle 10 and connected thereto through one or more fasteners extending through the one or more mounting holes 328 on the flange 326. The conduits 500 or cables 500 are routed from the vehicle 10 (FIG. 1) through the opening 322. At this point in the assembly, the conduits 500 may simply be extended through the opening 322 and dangling or hanging from the bracket 300 as the conduits 500 are not yet coupled to the sensor pod 12.

With continued reference to FIG. 15, the opening 226 on the sensor pod arm body 202 of the sensor pod arm 200 is aligned with the bracket in 304 on the bracket 300, such that a centerline axis of each is coaxial. The sensor pod 12, and thus the sensor pod arm body 202, is moved in the direction 400 toward the bracket 300 such that the opening 226 receives the bracket pin 318, resulting in the position shown in FIG. 16 (although shown as pivoted in FIG. 16, the sensor pod arm 200 may be aligned axially with the bracket 300 after lowered thereon, such as shown in FIG. 17).

Figure 16:
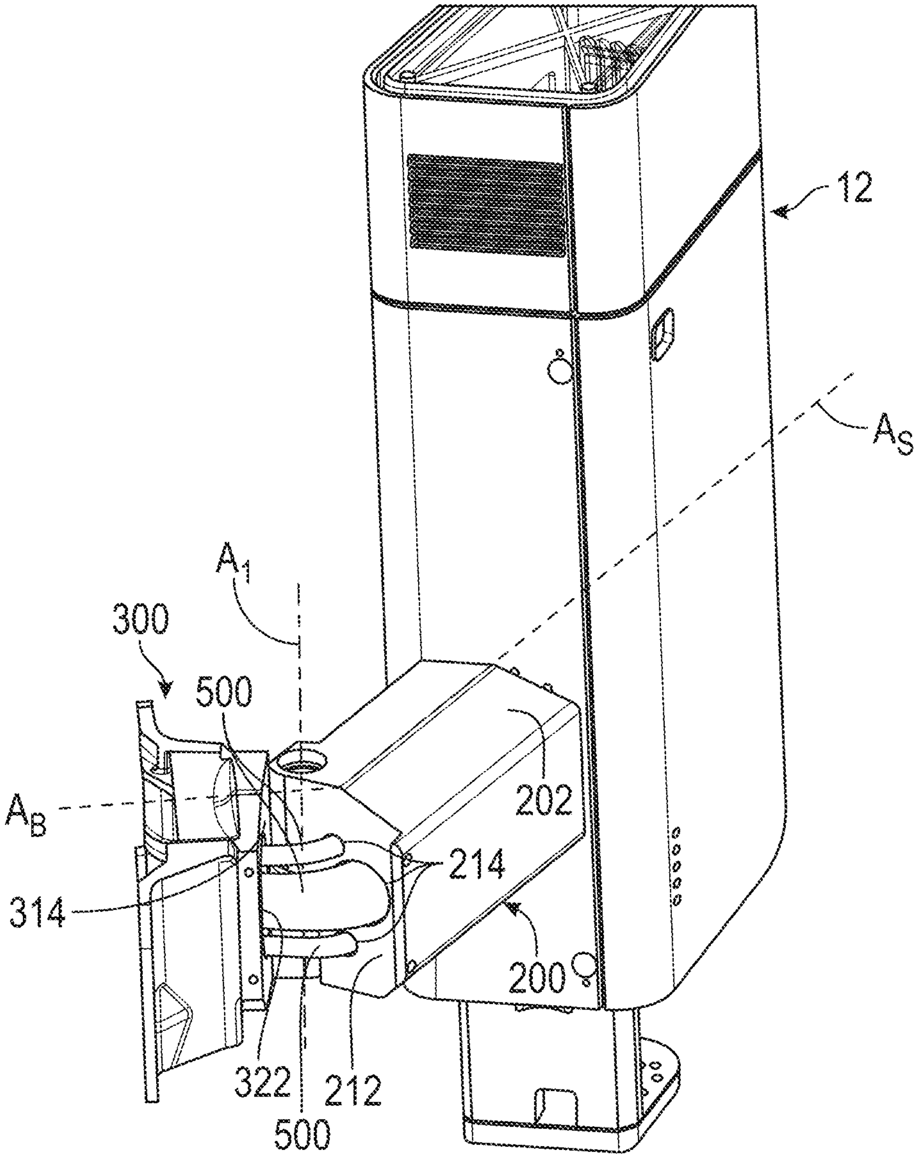
FIG. 16 illustrates an installation step for installing the sensor pod of FIG. 3, according to an embodiment of the present disclosure.

At this point in the installation process, and referring to FIG. 16, the sensor pod 12 is allowed to rotate about the axis $A_1$ extending through the bracket pin 318. This is because the fasteners 238 (FIG. 17) have not yet been installed and secured. In this manner, the sensor pod arm 200 and the sensor pod 12 are permitted to rotate about the axis $A_1$ with respect to the bracket 300 and with respect to the vehicle 10 (FIG. 1). In this position, a central longitudinal axis $A_B$ of the bracket 300 and a central longitudinal axis $A_S$ of the sensor pod arm 200 are allowed to be angled with respect to each other about the axis $A_1$. Until the fasteners 238 are installed, the sensor pod 12 is allowed to rotate between the position of FIG. 16 and the position of FIG. 17, and any position therebetween.

After the bracket pin 318 is received within the opening 226, the conduits 500 are routed from the opening 322 toward the openings 214 of the sensor pod arm 200. The ends of the conduits 500 (not visible in FIG. 16) are inserted into a respective opening of the openings 214 and routed into the cavity 220 (FIG. 18) of the sensor pod arm 200. Once the conduits 500 are through the one or more openings 214, the distal ends of the conduits may be loose (e.g., not connected to the connection points) within the cavity 220 of the sensor pod arm 200. At this point, the sensor pod 12 and the sensor pod arm 200 are rotated along the axis $A_1$ such that the side surface 212 of the sensor pod arm 200 and the side surface 314 of the bracket 300 are in touching contact with one another, as shown in FIG. 17 (where the surfaces are not visible). As the sensor pod arm 200 is rotated toward the position of FIG. 17, the distal ends of the conduits 500 may be simultaneously pulled taut from within the cavity 220. This prevents the conduits 500 from being caught or snagged between the side surface 212 and the side surface 314 when the side surfaces are in touching contact.

Figure 17:
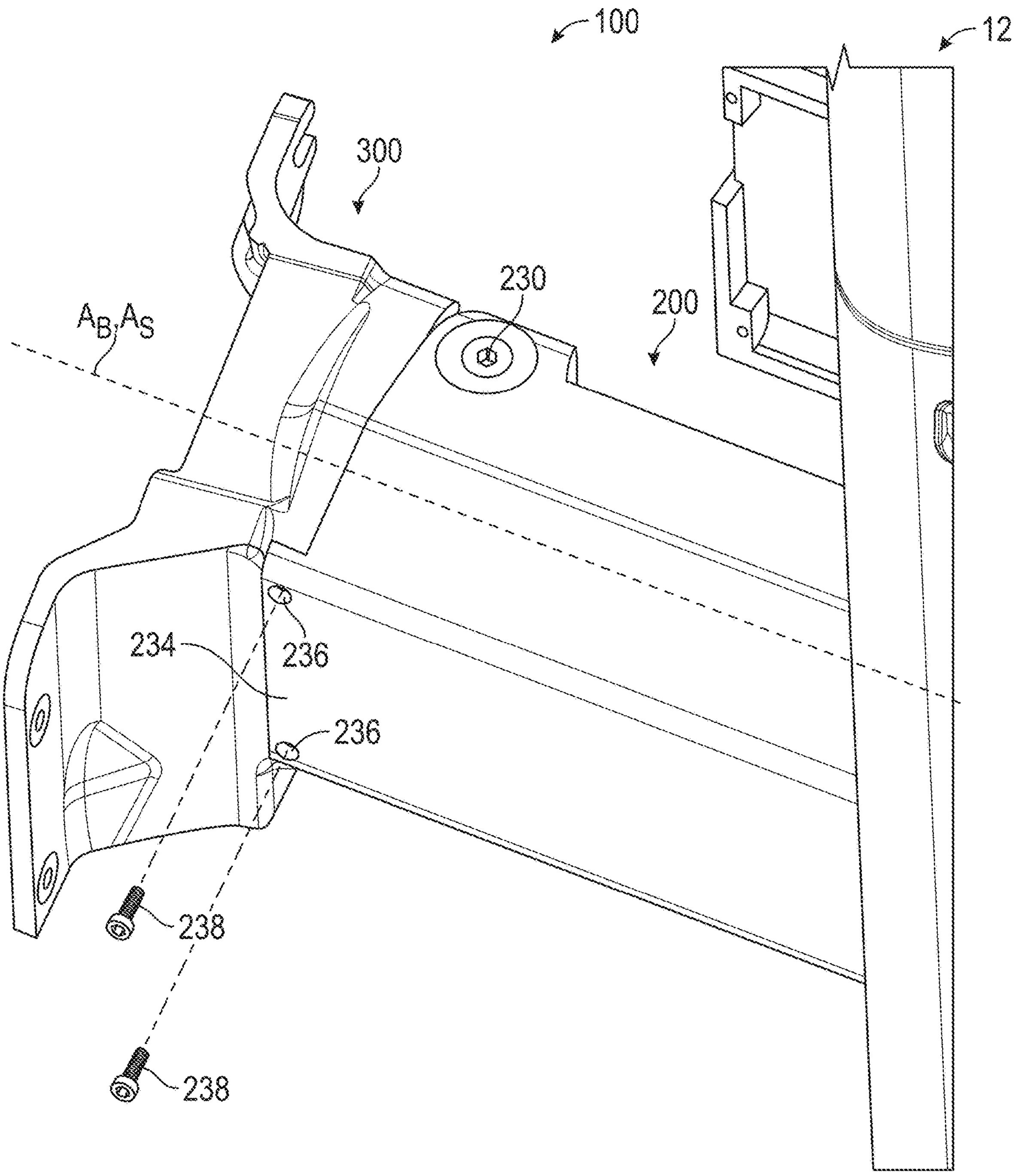
FIG. 17 illustrates an installation step for installing the sensor pod of FIG. 3, according to an embodiment of the present disclosure.

Referring now to FIG. 17, with the side surface 212 and the side surface 314 in touching contact, the central longitudinal axis $A_B$ of the bracket 300 and the central longitudinal axis $A_S$ of the sensor pod arm 200 are collinear. A surface 235 (FIG. 7, not visible in FIG. 17) of the sensor pod arm flange 234 touches the side surface 316 (FIG. 9) of the bracket 300 in the position of FIG. 17. Thus, the one or more openings 236 on the sensor pod arm flange 234 are aligned with the one or more openings 330 on the side surface 316. To secure the connecting assembly 100 against relative rotation between the bracket 300 and the sensor pod arm 200, the one or more fasteners 238 are inserted into the one or more openings 236 and the one or more openings 330 (not visible in FIG. 17, shown in FIG. 9) and secured in the openings 330. The securing may be through a threaded outer surface on the one or more fasteners 238 and a threaded inner surface on the one or more openings 330.

Figure 18:
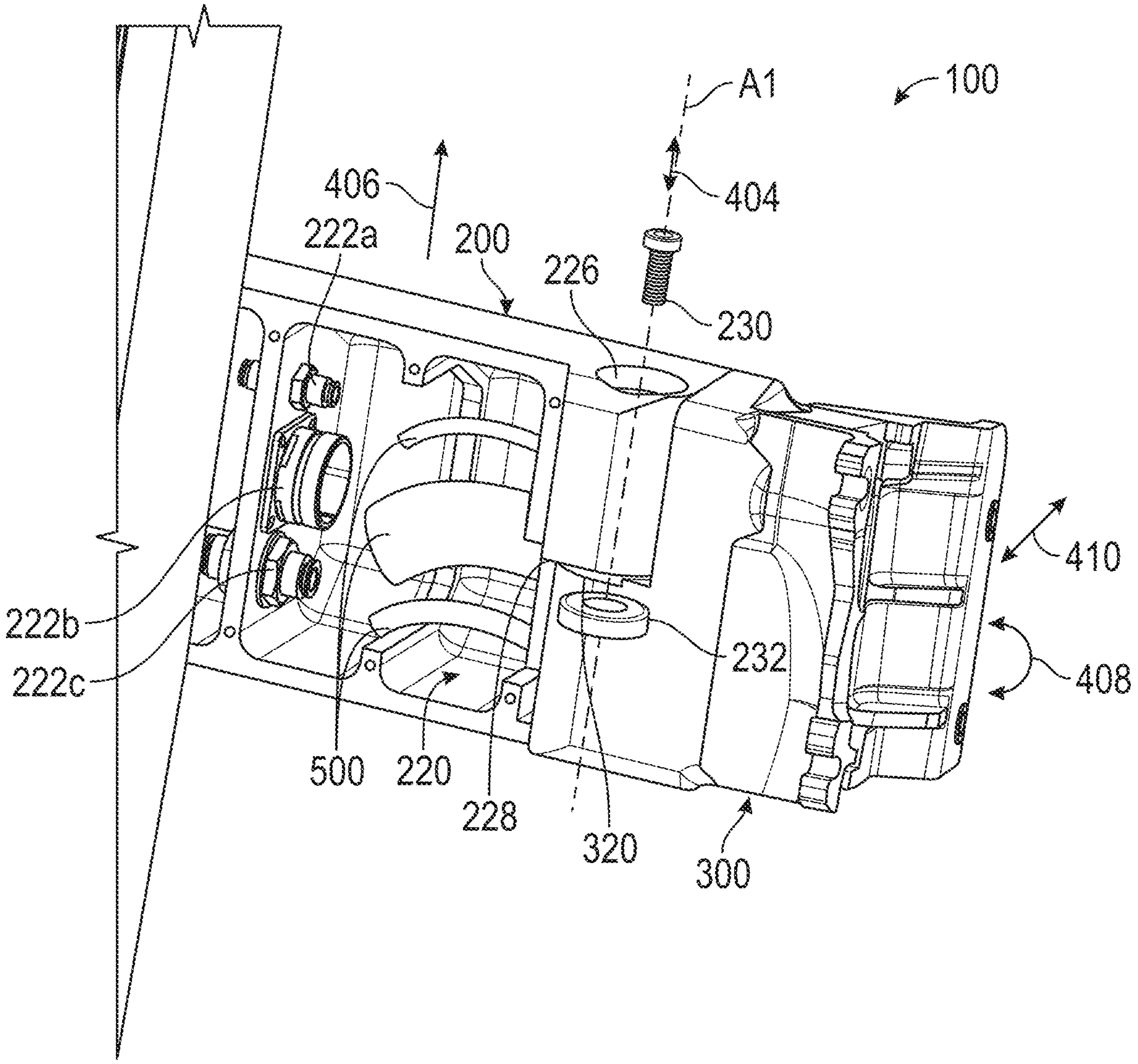
FIG. 18 illustrates an installation step for installing the sensor pod of FIG. 3, according to an embodiment of the present disclosure.

Referring to FIG. 18, the thrust bearing 232 and the fastener 230 may now be inserted in the direction 404 toward and into the opening 226 of the sensor pod arm 200. The thrust bearing 232 contacts the upper surface 320 (FIG. 9) of the bracket 300 and extends around an outer surface of the bracket pin 318 (not visible, shown in FIG. 9) when inserted in the opening 226. The fastener 230 is inserted into the threaded opening 332 (FIG. 9) of the bracket pin 318. The fastener 230 is threaded into the threaded opening 332 to secure the sensor pod arm 200 and the bracket 300 together. The fastener 230 secures the sensor pod arm 200 from moving vertically in a direction 406 away from the bracket 300. The conduits 500 may be extended into the cavity 220 but may not yet be connected to the conduit connectors 222*a*, 222*b*, and 222*c*.

At this point in the assembly, the connecting assembly 100 is secured in three directions. That is, the bracket 300 is fixedly secured to the sensor pod arm 200 and to the vehicle 10. The sensor pod 12 is prevented or limited in relative movement with respect to the bracket 300 and the vehicle 10 due to the connection. First, the connecting assembly 100 is secured against relative rotation in the direction 408 about the axis $A_1$ such that the sensor pod 12 is secured against relative rotation with respect to the vehicle 10 (FIG. 1). The connecting assembly 100 is secured against relative rotation due to the fasteners 238 (FIG. 17).

Second, the connecting assembly 100 is secured against vertical movement in the direction 406 away from the bracket 300 such that the sensor pod 12 is secured against vertical movement with respect to the vehicle 10 (FIG. 1). The connecting assembly 100 is secured against relative upward movement in the direction 406 due to the fastener 230 and is secured against relative downward movement in the direction 404 (opposite the direction 406) due to the touching of the lower surface 228 of the sensor pod arm protrusion 224 of the sensor pod arm 200 against the upper surface 320 of the bracket protrusion 304 of the bracket 300.

Third, the connecting assembly 100 is secured against lateral movement in the direction 410 such that the sensor pod 12 is secured against lateral movement with respect to the vehicle 10 (FIG. 1). The connecting assembly 100 is secured against relative lateral movement due to the interaction between the opening 226 and the bracket pin 318.

Figure 19:
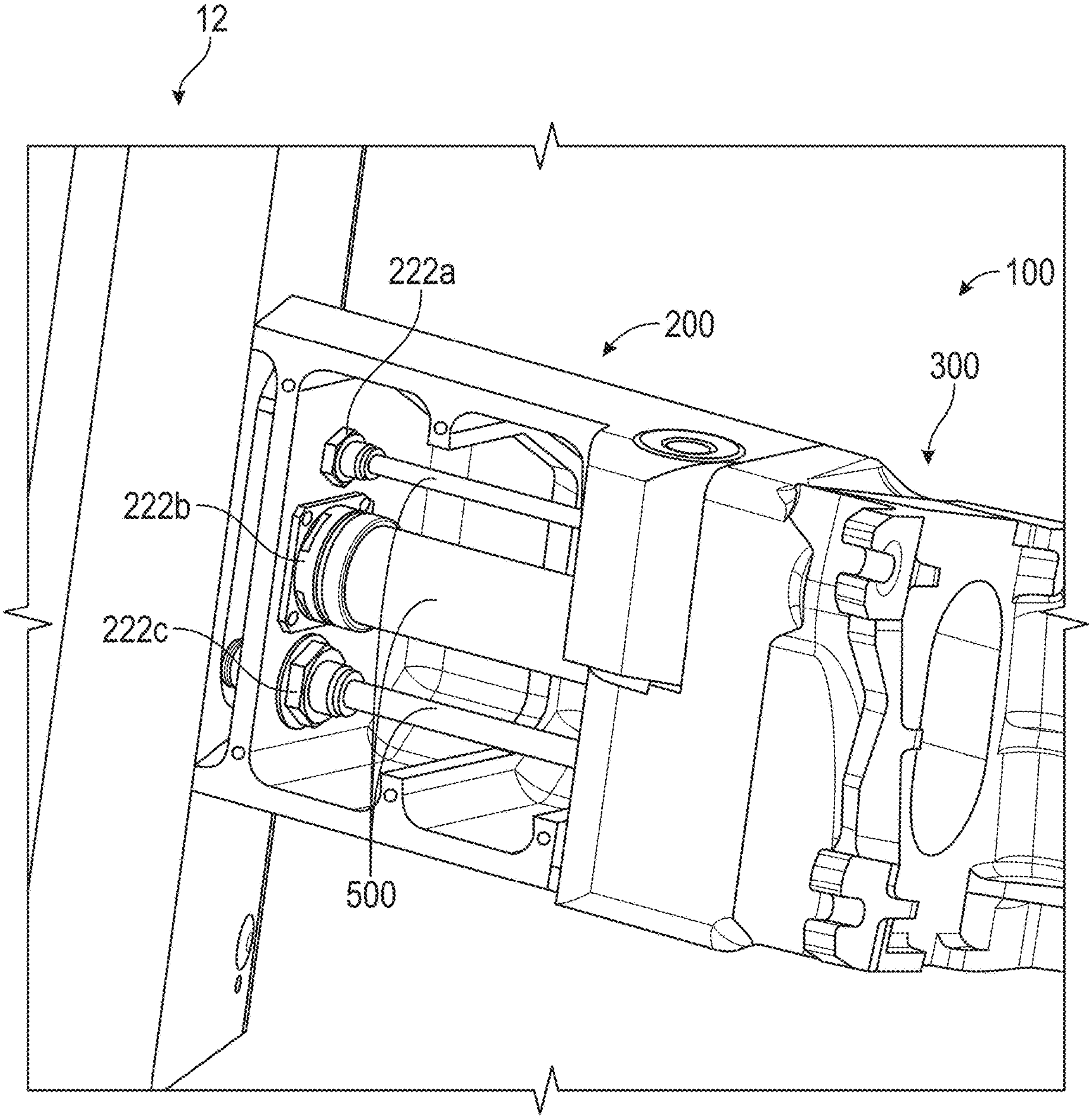
FIG. 19 illustrates an installation step for installing the sensor pod of FIG. 3, according to an embodiment of the present disclosure.
Figure 20:
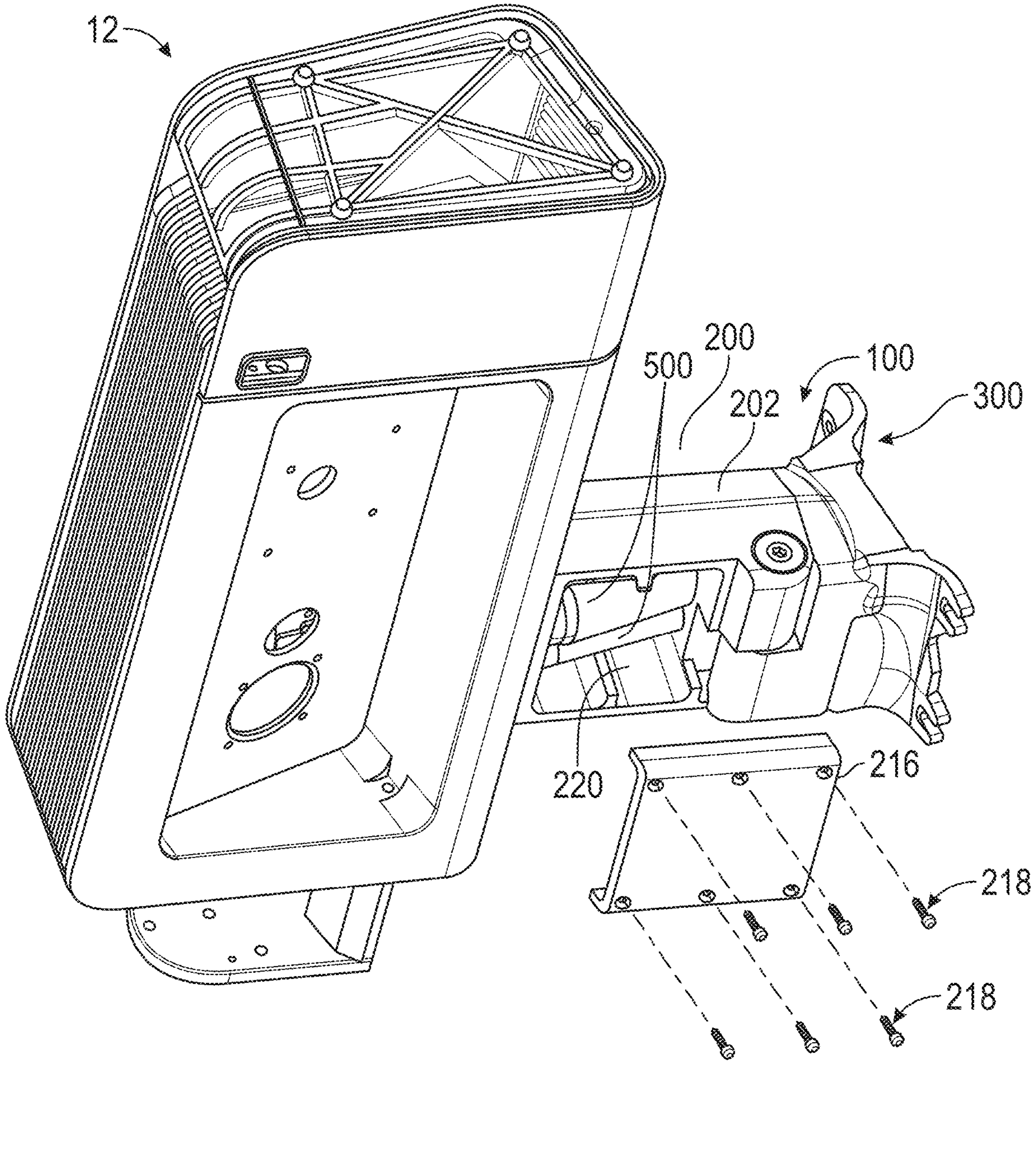
FIG. 20 illustrates an installation step for installing the sensor pod of FIG. 3, according to an embodiment of the present disclosure.

Continuing with assembly, and referring to FIG. 19, the conduits 500 may be connected to the respective one or more conduit connectors 222*a*, 222*b*, 222*c*. In this manner, the necessary fluids (e.g., water and air) and signals (e.g., power, communication, and data transmission) may be provided from the vehicle 10 (FIG. 1) to the sensor pod 12. Referring to FIG. 20, the cover 216 may be located over the cavity 220 to secure the conduits 500 therein. The one or more fasteners 218 may be installed to secure the cover 216 to the sensor pod arm body 202. Although three conduits 500 and six fasteners 218 are shown, more or fewer may be provided To remove the sensor pod 12 from the vehicle 10, a reverse procedure may be performed. That is, referring to FIG. 20, the one or more fasteners 218 may be removed to unsecure the cover 216 from the sensor pod arm body 202. Removing the cover 216 exposes the cavity 220 and the conduits 500 therein, as in FIG. 19. The conduits 500 may be disconnected from the respective one or more conduit connectors 222*a*, 222*b*, 222*c*. At this point, the conduits may still be extended into the cavity 220 but may be hanging free without connection to the sensor pod 12, as in FIG. 18.

Referring again to FIG. 18, the fastener 230 is removed (e.g., unthreaded and moved in the direction 406 away from the sensor pod arm 200) and the thrust bearing 232 is removed (e.g., moved in the direction 406 away from the sensor pod arm 200) from the opening 226. Referring now to FIG. 17, the one or more fasteners 238 are unsecured and removed from the one or more openings 236 and the one or more openings 330 (not visible in FIG. 17, shown in FIG. 9). The sensor pod 12 may now be rotated about the axis $A_1$ to the position in FIG. 16. The conduits 500 may be removed from the opening 214 such that the conduits no longer extend into the cavity 220 (FIG. 19), and instead extend out the end of the opening 322 as in FIG. 15. The sensor pod 12 may now be lifted vertically (in the direction 400 away from the bracket 300) to disconnect the sensor pod arm body 202 and thus, the opening 226, from the bracket pin 318, as shown in FIG. 15.

If desired, the bracket 300 may be removed from the vehicle 10 (FIG. 1) through removal of the fasteners in the flange 326 (FIG. 9). Alternatively, the bracket 300 may be maintained on the vehicle 10 and another sensor pod 12 or other assembly may be installed on the bracket 300.

Figure 21:
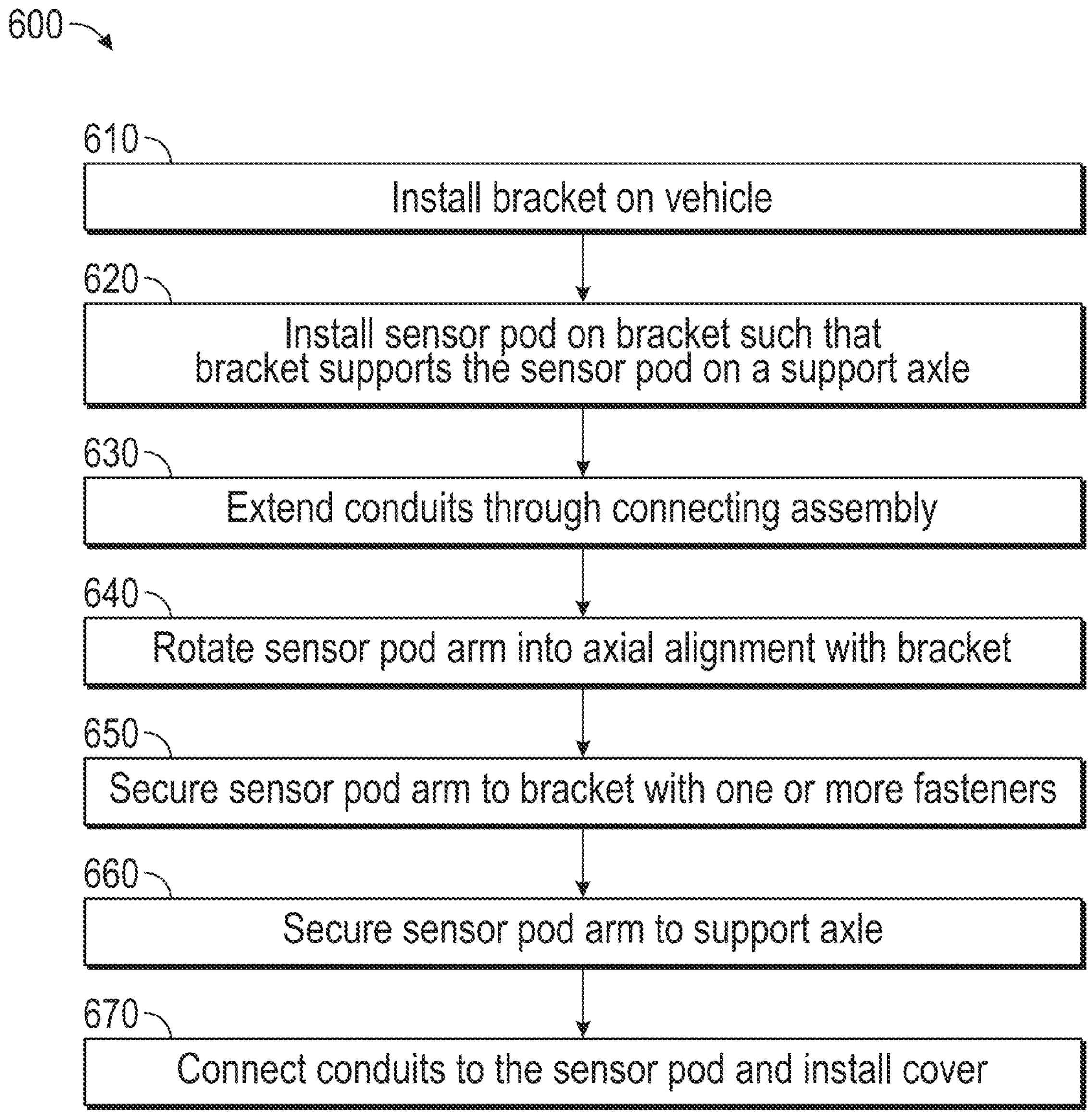
FIG. 21 illustrates a process for installing a sensor pod, according to an embodiment of the present disclosure.

A method 600 of installing a sensor pod 12 is also set forth in FIG. 21. In FIG. 21, at step 610 the bracket is installed on the vehicle. At step 620, the sensor pod is installed on the bracket such that the bracket supports the sensor pod on a support axle. At step 630, the conduits are extended through the connecting assembly. At step 640, the sensor pod arm rotates into alignment with the bracket. At step 650, the sensor pod arm is secured to the bracket with one or more fasteners. At step 660, the sensor pod arm is secured to the support axle. At step 670, the conduits are connected to the sensor pod and the cover is installed over the cavity of the sensor pod arm to secure the conduits therein.

Figure 22:
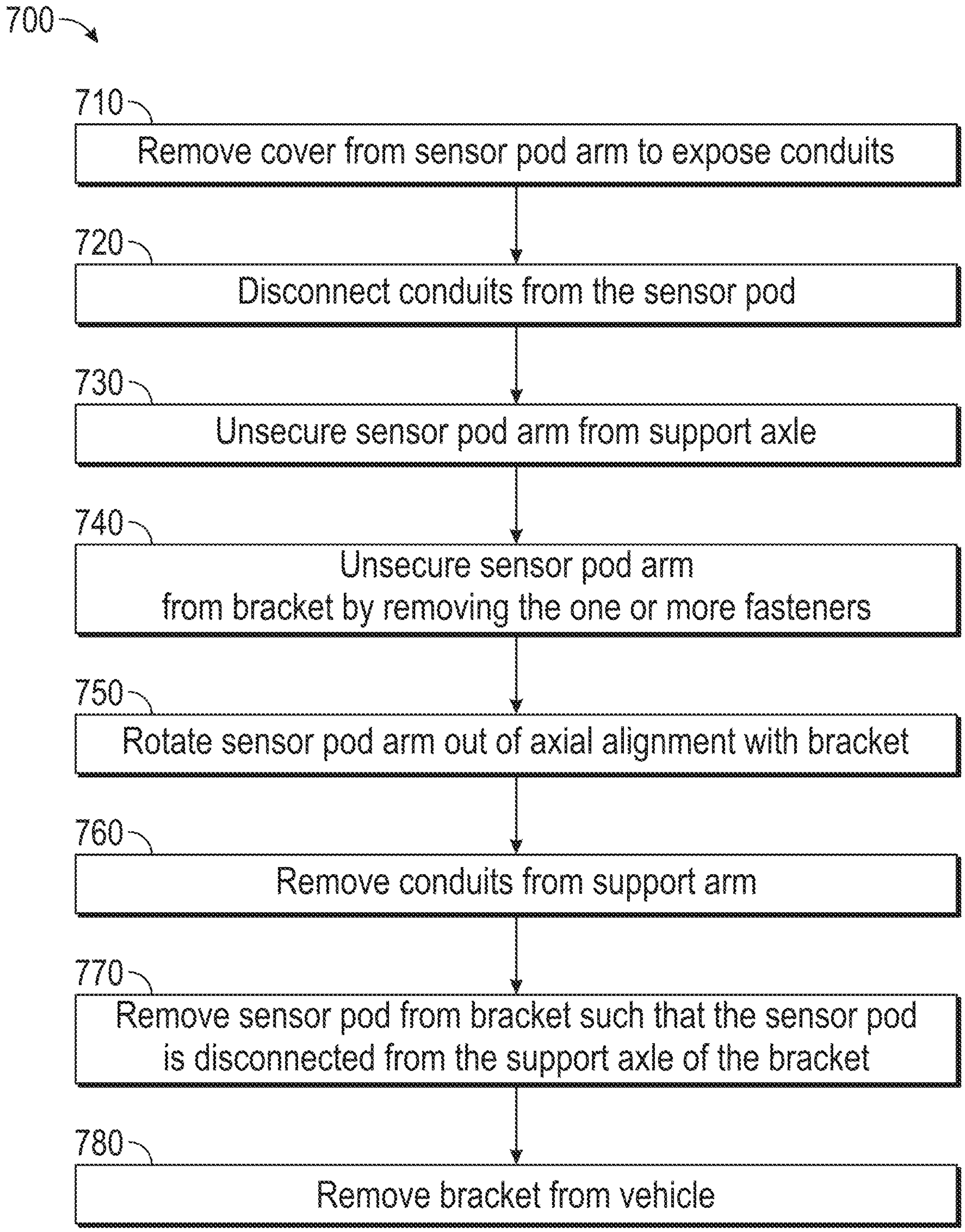
FIG. 22 illustrates a process for removing a sensor pod, according to an embodiment of the present disclosure.

FIG. 22 illustrates a method 700 of uninstalling the sensor pod 12. First, the cover is removed from the sensor pod arm to expose the conduits at step 710. Then, at step 720, the conduits are disconnected from the sensor pod. At step 730, the sensor pod arm is unsecured from the support axle. At step 740, the sensor pod arm is unsecured from the bracket by removing the one or more fasteners. The sensor pod arm is rotated out of axial alignment with the bracket at step 750. At step 760, the conduits are removed from the support arm. At step 770, the sensor pod is removed from the bracket such that the sensor pod is disconnected from the support axle of the bracket. Step 780 is optional, that is, it is optional to remove the bracket from the vehicle.

Accordingly, the connecting assembly 100 of the foregoing description provides a rigid and stable connection between the vehicle 10 and the sensor pod 12. The terms "rigid" and "stable" indicate that there is no relative motion between the sensor pod 12 and the vehicle 10 when the sensor pod 12 is affixed to the vehicle 10 with the connecting assembly 100. Thus, during operation of the vehicle 10, the sensor pod 12 will move in the same direction of travel as the vehicle 10. Such a rigid and stable connection allows for the sensor pod 12 to gather data and assist in navigation of the vehicle 10 with reduced or eliminated noise that is associated with relative motion of the sensor pod 12 with respect to the vehicle 10. As mentioned previously, the rigid connection provided by the connecting assembly 100 provides an anti-vibration system which results in the reduced or eliminated noise as there is minimal or no resonant vibration due to the sensor pod 12 moving with the vehicle 10. That is, the connecting assembly prevents or limits vibration of the sensor pod 12 with respect to the vehicle through the rigid connection of the connecting assembly 100, and in particular, due to the fixation points, as described previously. Reduction or prevention of vibration of the sensor pod 12 is important for the proper function of the sensor pod 12 and the sensors therein, which in turn is important to the proper operation of the vehicle 10. Vibration of the sensor pod 12 caused by an improperly or non-rigidly secured sensor pod 12 may affect the accuracy and precision of the sensors, which negatively impacts the operation of the sensor pod 12 and the vehicle 10.

With such a rigid connection, it is desirable to also provide the connecting assembly 100 with a design to minimize damage to the sensor pod 12, the vehicle 10, or other structures or vehicles that the vehicle 10 may contact, collide, or impact. That is, if the vehicle 10 collides with another object, which may be an inanimate or animate object, such as, for example, but not limited to, another vehicle, structure (e.g., building, lamppost, mailbox, etc.), or being (human or animals). The collision may be, for example, a head-on collision, sideswipe, etc. The collision may be caused by the vehicle 10 or the other object. In such collisions, the sensor pod 12 may be damaged, may damage the other object involved in the collision, or may damage the vehicle 10, or combinations thereof. If the connecting assembly 100 is maintained rigid during the entirety of the collision, the full force of the sensor pod may collide with the other object. Given the weight and size of the sensor pod 12, this may provide significant damage as previously noted.

In order to prevent, reduce, limit, eliminate, or otherwise mitigate the damage to the sensor pod, the vehicle 10, and/or the other object, the connecting assembly 100 is thus, designed to rigid during normal operating conditions (e.g., to provide no relative movement between the sensor pod 12 and the vehicle 10) as described previously, but also to weaken, fail, or flex at one or more predetermined points in the connecting assembly 100 such that relative movement of the sensor pod 12 is permitted with respect to the vehicle 10. In this situation, the sensor pod 12, when experiencing a predetermined force, may fold or flex inwards and rearwards toward the vehicle 10 (e.g., toward the vehicle doors).

The relative inward and rearward movement of the sensor pod 12 with respect to the vehicle 10 is achieved through the connecting assembly 100. The connecting assembly 100 is constructed to have a failure point at a predetermined force that allows the connecting assembly 100 to transition from the rigid construction discussed previously to a flexible construction which allows relative rotation of the sensor pod arm 200 with respect to the bracket 300 and the vehicle 10. The predetermined force is a force at which the connecting assembly transitions from the rigid construction to the flexible construction. In some examples, the predetermined force is the force at which the fasteners 238 (FIG. 7) shear or fail. In some examples, the predetermined force is the force at which the crumple zone is activated (e.g., the sides 202*c* and 204*c* in FIG. 3 are caused to fail). In some examples, the predetermined force is the force at which the force of friction and the spring is overcome to allow rotation (FIG. 14). In some examples, the predetermined force is a collision force or predetermined collision force. In some examples, the predetermined force is not a force caused by normal operation of the vehicle, such as, for example, operating the vehicle over a pothole, the force of rocks or road debris being kicked up from the road during operation of the vehicle, or the like. In some examples, the predetermined force is caused by a head-on collision, a rear collision, or side collision of the vehicle and another object, whether animate or inanimate. In some examples, the predetermined force is a force experienced on the sensor pod 12. In some examples, the predetermined force is about 550 LBF or greater of force acting on the sensor pod 12.

Thus, when the sensor pod 12 is impacted with the predetermined force, the fasteners 238 (FIG. 17) are sheared or otherwise broken such that relative rotation of the sensor pod arm 200 with respect to the bracket 300 is permitted about the axis $A_1$ of FIG. 16 (e.g., due to the bracket pin 318 of FIG. 15). The relative rotation allows the sensor pod arm 200 and the sensor pod 12 to move from the rigid operating position of FIG. 3 in a rearward and inward direction toward the vehicle 10, as shown by the relative positioning of FIG. 16. Thus, the relative rotation moves the sensor pod 12 out of the line of collision and prevents or limits the full weight and force of the sensor pod 12 from causing further damage to the sensor pod 12, causing further damage to the other object involved in the collision, and/or from adding additional debris (e.g., from the sensor pod 12 or associated parts) to the roadway. The reducing or limiting of damage and debris is due to the sensor pod's movement inward and out of the way of any further potential collision. Therefore, damage may be minimized. The conduits 500 provide within the cavity 220 are arranged such that there is slack or extra length in the conduits. The extra length of the conduits 500 may reduce or prevent severing of the conduits 500. When the sensor pod 12 rotates inward toward the vehicle 10, the conduits 500 will have enough slack or extra length to move with the sensor pod 12 without severing or breaking along the length of the conduits 500.

Accordingly, the fasteners 238 (FIG. 17) may be shear screws, frangible fasteners, or other fasteners predesigned to fail, break, or sever at a predetermined force. The fasteners 238 may be designed to fail or break at a force that is lower than a force that would break the sensor pod 12, the sensor pod arm 200, the bracket 300, or the fasteners which couple the bracket 300 to the vehicle 10. Due to the lower failure force, failure of the fasteners 238 before the other components may limit the amount of debris on the roadway since further collision of the sensor pod 12 is avoided due to the rotation discussed above. Rotating the sensor pod 12 out of the way of collision before the sensor pod 12, the sensor pod arm 200, or the bracket 300 or fasteners of the bracket 300 are allowed to fail reduces the likelihood that the entirety of the assembly shown in FIG. 3 ends up as debris on the roadway, thus, also reducing the likelihood of total catastrophic damage to the sensor pod 12, such that the sensor pod 12 would be unable to be repaired.

Alternatives to a shear screw are contemplated to provide the transition from a rigid connecting assembly to a flexible connecting assembly. For example, a detent mechanism may be used. In some examples, the shear fastener 238 may be preferred. The sensor pod 12, with the sensors and hardware needed to support autonomous or semi-autonomous driving of the vehicle, are heavy. Indeed, the sensor pod 12, with the additional sensors and hardware, which may not be included on a conventional side view mirror, is comparatively heavier than the conventional side view mirror. A conventional side view mirror refers to a side view mirror that may include only mirrors and a housing and/or may include some sensors or cameras for assisting in side view or rear view, but does not include the additional sensors and hardware required to support autonomous driving (e.g., lidar and the like). Providing the shear fastener 238 assists in supporting the load of the sensor pod 12 and thus reduces vibrations experienced by the sensor pod 12 and assists in providing the rigid connection of the connecting assembly 100. Therefore, the fastener 238 is selected and/or designed to withstand the predetermined vibrational forces of the sensor pod 12, but also selected and/or designed to fail at a predetermined collision force that may act upon the sensor pod 12.

Furthermore, due to the removable connection between the sensor pod arm 200 and the bracket 300, the sensor pod 12 (whether involved in a collision or required to be updated, evaluated, repaired, or the like) may be removed for replacement, repairing, evaluation, etc. A new, different sensor pod 12 may be installed on the bracket 300 and/or the original sensor pod 12, once repaired, updated, or confirmed to be operational, may be installed on the bracket 300. Accordingly, the connecting assembly 100 provides a rigid connection, a flexible connection, and a removable connection. As long as the sensor pod 12 includes a sensor pod arm 200 that cooperates with and mates with the bracket 300 (e.g., with the side surface 314 and the bracket pin 318), any sensor pod 12 or other structure may be installed on the bracket 300.

As mentioned with respect to FIGS. 13 and 14, the alteration of the connecting assembly 100 from a rigid connection to a flexible connection may be provided with or combined with other structure, such as, for example, the weakened upper side 202*c* and the weakened lower side 204*c* of FIG. 13. In this example, when the predetermined force acts upon the sensor pod 12, the connecting assembly 100*c* may crumple or bend in a vertical direction (due to the sides 202*c* and 204*c* being weaker as compared to the sides 206*c* and 208*c*) allowing the sensor pod 12 to move relatively upward or downward and toward the vehicle 10, again moving the sensor pod 12 out of the line of further collision. In this regard, the connecting assembly 100*c* is provided with a crumple zone that provides a weakened or reduced strength condition as compared to the remainder of the connecting assembly 100*c*. Though not shown, a removable connection or quick-swap connection may further be provided between the sensor pod arm 200*c* and the bracket 300*c* such that a new sensor pod arm 200*c* with a new sensor pod 12 may be installed on the bracket 300*c*.

Similarly, with respect to FIG. 14, the predetermined force acting on the sensor pod 12 may counteract friction and act against the spring of the connecting assembly 100*d*, causing the aforementioned relative movement.

Therefore, the connecting assembly of the present disclosure provides a rigid connection between a sensor pod and a vehicle during the normal operating conditions of the vehicle. Such a rigid connection prohibits, limits, reduces, or prevents relative motion between the sensor pod and the vehicle. The connecting assembly of the present disclosure further provides a flexible connection between the sensor pod and the vehicle when the sensor pod is acted upon by a predetermined force. The flexible connection allows relative movement between the sensor pod and the vehicle. Furthermore, the connecting assembly of the present disclosure provides a removable or detachable connection between the sensor pod and the vehicle 10 such that the sensor pod 12 may be easily and quickly removed, repaired, replaced, interchanged, or otherwise uninstalled and installed on the vehicle 10 at any location. That is, no relocation to a repair shop or manufacturing facility is required to install or uninstall the sensor pod.

Accordingly, the sensor pod of the present disclosure may be a quick swap sensor pod. That is, due to the connecting assembly, the sensor pod may be removed and installed on a vehicle in a quick manner by a single operator. In some examples, the sensor pod as a quick swap sensor pod includes a support axle. The support axle is formed to support the weight of the quick swap sensor pod before installation is complete (e.g., at a step of installation when the sensor pod is coupled to the bracket, but before the rigid connection is formed with the fasteners). The support axle may be formed with a depth, length, diameters, width, material, or combinations thereof to accomplish the support of the weight of the sensor pod. The support axle may also counteract a moment created by the weight of the sensor pod acting on the connecting assembly. That is, the weight of the sensor pod will provide a vertically downward force acting to rotate or bend the connecting assembly vertically downward. The support axle may counteract this bending moment, further achieving the aforementioned rigid connection which limits or prevents relative movement between the sensor pod and the vehicle.

In some examples, the support axle may be formed of the pin receiving opening and the pin. As discussed previously, the pin receiving opening may extend from one of the sensor pod arm or the bracket, with the pin extending from the other of the sensor pod arm or the bracket. The pin receiving opening may have a depth that correlates to a length of the pin. Both the depth of the pin receiving opening and the length of the pin are predetermined to counteract the bending moment and to support the weight of the quick swap sensor pod.

During installation of the quick swap sensor pod, the quick swap sensor pod is moved between an initial position (e.g., FIG. 16) and a final position (e.g., FIG. 20). In the initial position, the quick swap sensor pod is supported by the support axle, but the horizontal axis ($A_S$) of the quick swap sensor pod is angled with respect to the horizontal axis ($A_B$) of the bracket (as shown and described with respect to FIG. 16). In this condition, the quick swap sensor pod is resting on the bracket and is fully supported thereby. In the final position (e.g., FIG. 20), the sensor pod is rotated such that the horizontal axes of the sensor pod arm (As) and the bracket ($A_B$) are aligned (as shown and described with respect to FIG. 17) and the fasteners (e.g., 238 and 232 of FIGS. 17 and 18) are secured therein to form the rigid connection discussed previously. In both the initial position and the final position, the length of the support axle (e.g., the depth of the pin receiving opening and/or the length of the pin) is selected to counteract a moment created by the weight of the quick swap sensor pod and the lower surface of the sensor pod arm is configured to support the weight of the quick swap sensor pod.

In some examples of the quick swap sensor pod, the depth of the pin receiving opening and/or the length of the pin is further selected to allow installation of the quick swap sensor pod by a single operator. Furthermore, the lower surface of the protrusion extending from the sensor pod arm rests on an upper surface of the protrusion of the bracket to support the weight of the quick swap sensor pod. Additionally, the length of the pin is selected to counteract a moment created by a weight of the quick swap sensor pod and the upper surface of the protrusion extending from the bracket is configured to support the weight of the quick swap sensor pod.

With the above configurations, the quick swap sensor pod may be installed and removed a plurality of times. The quick swap sensor pod may have a common arm that interacts with the bracket arm but may have a housing with different configurations of mirrors, sensors, or the like. In this manner, the quick swap sensor pod may be interchangeable with other quick swap sensor pods of the same or different configurations. Furthermore, in the event the quick swap sensor pod is needed to be removed due to damage, need for repair, need for calibration, software updating, hardware updating, etc., the quick swap sensor pod may be removed and reinstalled or removed and replaced with another quick swap sensor pod.

In some examples of the quick swap sensor pod, the support axle extends vertically between the sensor pod and the bracket. The quick swap sensor pod and the sensor pod arm rotate about the support axle and with respect to the bracket between the initial position and the final position, in the manner previously described. In both the initial position and the final position, a length of the support axle is selected to counteract a moment created by a weight of the quick swap sensor pod and to support the weight of the quick swap sensor pod. The support axle may extend from the sensor pod arm, the bracket, or both the sensor pod arm and the bracket. The support axle may include the pin receiving opening and the pin for installation in the pin receiving opening. As mentioned, the pin receiving opening may extend from the sensor pod arm and the pin may extend from the bracket. In another example, the pin receiving opening may extend from the bracket and the pin may extend from the sensor pod arm. The length of the support axle is further selected to allow installation of the quick swap sensor pod by a single operator and/or may allow installation and removal a plurality of times.

The connecting assembly of the present disclosure allows for connection of sensors within the sensor pod to be connected to the vehicle via one or more conduits. The conduits are connected to a conduit connector (e.g., 222 of FIG. 7) located on the housing of the sensor pod and within a cavity of the sensor pod arm. A removable cover can be placed over the cavity to allow selective access to the cavity and the conduit connector. The conduit extends from the conduit connector to the vehicle. The conduit is connected to the conduit connector to form a conduit connector point. The conduit connector point has a shear strength. That is, a point at which the conduit will become disconnected from the conduit connector. This shear strength is less than the shear strength of the conduit. In this manner, if the sensor pod is involved in a collision, the conduits will become disconnected from the conduit connector instead of being severed. This allows for the conduits to be reused with the repaired sensor pod or the replacement sensor pod. The conduit is configured to disconnect from the conduit connector point at a force lower than a force to sever the conduit.

In some examples, the conduits may extend from the vehicle with extra length than is needed to reach from the vehicle to the conduit connector. This extra length is a slack length of the conduit. The extra length permits the conduits to be connected to the connection point in the pivoted position of FIG. 16 and in the aligned position of FIG. 17 and remain connected when moved from the aligned position to the pivoted position, the length of slack is a length of the conduit that extends from the vehicle to the conduit connector, the length of slack being longer than an internal length of the arm to allow for the conduit to maintain connection at the conduit connector point when the arm is moved from the first position to the second position. Furthermore, as previously described, the arm has a first lateral distance in the first position and a second lateral distance in the second position, the second lateral distance greater than the first lateral distance. The length of the conduit is at least equal to the second lateral distance. The length of slack is at least equal to the difference between the second lateral distance and the first lateral distance.

As mentioned previously, there may be a plurality of conduits and conduit connectors. Each connection of the conduit with the conduit connector forms a conduit connector point. A conduit may be a fluid conduit, such as a water conduit or air conduit, or may be an electrical conduit, allowing power and data signals to transfer therethrough.

The conduits may have connections for coupling to the conduit connectors in the sensor pod that are designed to interact with any number of sensor pods. In this manner, the sensor pods may be interchanged on the vehicle without having to remove and replace the conduits.

As discussed previously, a predetermined force, referred to interchangeably as a predetermined collision force, acting on the sensor pod may cause the connecting assembly to change from a rigid connection to a flexible connection. The predetermined force may be selected based on force simulations. The predetermined force may be a force that directly impacts the sensor pod. Small forces (e.g., forces below the predetermined force) on the sensor pod, such as, for example, but not limited to forces caused by normal operating conditions (e.g., rocks kicked up during road travel), may not affect the rigidness of the connecting assembly. That is, these forces may be below the predetermined force to shear the fasteners (or cause the crumple or spring compression).

The connecting assembly, or any part or combination of parts thereof, may be formed of metal, such as, for example, aluminum, composites, such as, for example, fiber glass, carbon fiber, or other known materials, or combinations thereof. The connecting assembly, or any part or combination of parts thereof, may be formed by casting, machining, molding, or other known manufacturing methods, or combinations thereof. The bracket arm pin may be formed of a chrome plated hardened steel or other known materials for providing a bearing surface.

The connecting assembly of the present disclosure provides both a rigid connection and a flexible connection between a sensor pod and a vehicle. The connecting assembly allows for a rigid assembly between the parts during the normal operation of the vehicle such that there is little or no relative movement between the sensor pod and the vehicle. If the sensor pod experiences a predetermined collision force, the connecting assembly becomes a flexible connection, allowing the sensor pod to move with respect to the vehicle out of the way of further collision, reducing damage or harm to the sensor pod, the vehicle, or the other object to the collision and reducing the amount of debris on the road caused by the collision. The connecting assembly of the present disclosure also provides a universal connection point that allows for a multitude of types of sensor pods to be installed, removed, or interchanged, etc. with the vehicle in a quick and efficient process that may occur anywhere, including outside of a manufacturing facility or repair shop.

The connecting assembly of the present disclosure further allows for a quick swap sensor pod and a universal bracket such that a multitude of sensor pods may be interchanged on the vehicle quickly and efficiently. The connecting assembly may allow for a rigid connection during operation that operates as an anti-vibration system to reduce extraneous vibration and noise to the sensor pod. The structure of the connecting assembly may support the weight of the sensor pod and counteract the moment acting on the connecting assembly by the weight of the sensor pod.

According to embodiments of the present disclosure, a sensor pod is connected to the truck frame with a universal bracket. The universal bracket has a planar face having at least three fixation points generally perpendicular to face. A port extends through the planar face for passing leads. The universal bracket includes a connecting mechanism to the sensor pod. The sensor pod has an arm extending from bracket, a housing supporting a plurality of sensors, and a plurality of lead connectors in the arm. The planar face is configured to connect to any one of a plurality of truck frames and the connecting mechanism is configured to connect to any one of a plurality of sensor pods.

According to embodiments of the present disclosure, a quick swap sensor pod for a truck includes an arm, a face on the arm having a post receiving hole having a depth and aligned vertically. The post receiving hole has enough depth for the hole to counteract a moment from the weight of the sensor pod at a distance of the arm and also to easily rotate sensor pod about the post receiving hole. The arm includes enough surface on the face to support the weight of the sensor pod and also to easily rotate the sensor pod about the post receiving hole. The quick swap sensor pod includes a connecting mechanism in the arm for connecting leads while the arm is at a first rotation angle. The quick swap sensor pod includes fixation holes aligned to affix the connecting mechanism.

According to embodiments of the present disclosure, an apparatus for reducing damage and debris from a hit to a sensor pod includes a bracket having a post for rotation of the sensor pod around post, an axle bolt to fix the sensor pod from backing off post, and a second frangible fixation point set away from the post configured to break apart when the sensor pod is struck with a force that would otherwise damage the sensor pod. According to embodiments of the present disclosure, a method for reducing damage includes a fixing step to stop backing off post, a rotating step to align second fixation alignment, and a tightening step to tighten a second fixation to a load less than is tension strength.

According to embodiments of the present disclosure, an apparatus for connecting sensors in a sensor pod to a truck includes connectors located on a sensor housing having a first shear strength when the connector is in tension, leads extending from the connectors to the truck having a second shear strength when the leads are in tension, the leads additionally having slack in their length. The first shear strength is less than second shear strength.

Further aspects of the present disclosure are provided by the subject matter of the following clauses.

A universal bracket for connecting a sensor pod and a vehicle, the universal bracket having a first end including a surface for connecting to the vehicle, a second end for connecting to the sensor pod, three fixation points extending perpendicular to and through the surface for preventing lateral movement, vertical movement, and forward movement of the universal bracket with respect to the vehicle, the three fixation further preventing rotational movement of the universal bracket with respect to the vehicle, and at least one port extending from the first end through the arm, the at least one port configured to allow passage of one or more conduits extending from the vehicle to the sensor pod.

The universal bracket of the preceding clause, wherein the three fixation points are not collinear.

The universal bracket of any preceding clause, wherein the surface is configured to couple to an A-pillar of the vehicle.

The universal bracket of any preceding clause, wherein the surface is a planar surface.

The universal bracket of any preceding clause, wherein the three fixation points are provided by fasteners extending through openings in the universal bracket.

The universal bracket of any preceding clause, further comprising an arm extending between the first end and the second end.

The universal bracket of any preceding clause, further comprising a protrusion extending from the arm, the protrusion including a support axle extending from an upper surface of the protrusion.

The universal bracket of any preceding clause, further comprising a side surface on the arm, the side surface including an opening configured to receive a fastener.

The universal bracket of any preceding clause, wherein the opening comprises two openings configured to receive two fasteners.

A universal bracket for connecting a sensor pod and a vehicle, the universal bracket including a first end having a surface for connecting to the vehicle, a second end for connecting to the sensor pod, three fixation points extending perpendicular to the surface for preventing lateral movement, vertical movement, and rotational movement of the universal bracket with respect to the vehicle, a bracket arm protrusion extending from the second end, and a bracket pin extending vertically upward from an upper surface of the bracket arm protrusion, the bracket pin and the upper surface configured to receive a sensor pod arm of the sensor pod.

The universal bracket of any preceding clause, further comprising at least one port extending through each of the bracket and the sensor pod arm, the at least one port configured to allow passage of one or more conduits extending from the vehicle to the sensor pod.

The universal bracket of any preceding clause, wherein the three fixation points are not collinear.

The universal bracket of any preceding clause, wherein the bracket is removably coupled to the sensor pod arm.

The universal bracket of any preceding clause, wherein the bracket includes a bracket raised portion in touching contact with a sensor pod arm raised portion of the sensor pod arm.

A connecting assembly for coupling a sensor pod to a vehicle, the connecting assembly having a universal bracket having a bracket port extending from a truck facing side of the bracket to a sensor pod facing side of the bracket, a sensor pod arm having a sensor pod arm port extending from a bracket facing side of the sensor pod to a cavity of the sensor pod arm, and a conduit connector located in the cavity, wherein the bracket port and the sensor pod arm port are aligned, and wherein a conduit is configured to extend from the vehicle, through the aligned bracket port and sensor pod port, and connect to the conduit connector.

The connecting assembly of the preceding clause, wherein the sensor pod port comprises three sensor pod ports and the conduit connector comprises three conduit connectors, and wherein each of the three sensor pod ports is aligned with a respective one of the three conduit connectors such that three conduits may be coupled to the three conduit connectors.

The connecting assembly of any preceding clause, further comprising a cover for removably coupling to the sensor pod arm to provide selective access to the cavity.

The connecting assembly of any preceding clause, wherein the sensor pod facing side of the bracket mates with the bracket facing side of the sensor pod.

The connecting assembly of any preceding clause, further comprising three fixation points configured to prevent translation of the universal bracket with respect to the vehicle.

The connecting assembly of any preceding clause, wherein the three fixation points are not collinear.

A quick swap sensor pod for a truck, the quick swap sensor including an arm having a protrusion with a lower surface, a pin receiving opening extending through the protrusion to the lower surface, the pin receiving opening having a depth and aligned vertically, and a conduit connector within the arm for coupling a conduit to the quick swap sensor pod, wherein the arm is configured to rotate about an axis of the pin receiving opening between an initial position and a final position, and wherein, in both the initial position and the final position, the depth of the pin receiving opening is configured to counteract a moment created by a weight of the quick swap sensor pod and the lower surface is configured to support the weight of the quick swap sensor pod.

The quick swap sensor pod of the preceding clauses, wherein the depth of the pin receiving opening is further selected to allow installation of the quick swap sensor pod by a single operator.

The quick swap sensor pod of any preceding clause, further comprising one or more openings for receiving one or more fasteners configured to secure the arm in the final position.

The quick swap sensor pod of any preceding clause, further comprising a cavity in the arm, the conduit connector located within the cavity.

The quick swap sensor pod of any preceding clause, wherein the conduit connector comprises a water connection, a power connection, and an air connection.

The quick swap sensor pod of any preceding clause, the protrusion further comprising an upper surface and the pin receiving opening extending through the protrusion from the upper surface to the lower surface.

The quick swap sensor pod of any preceding clause, wherein the lower surface of the protrusion is configured to rest on an upper surface of a mating bracket to support the weight of the quick swap sensor pod.

The quick swap sensor pod of any preceding clause, wherein the arm is configured to be assembled and disassembled on a bracket a plurality of times.

A bracket for a quick swap sensor pod, the bracket including an arm having a protrusion with an upper surface and a lower surface, and a pin extending vertically from the upper surface of the protrusion, the pin having a length, wherein the pin is configured to allow rotation of the quick swap sensor pod with respect to the arm, and wherein, the length of the pin is selected to counteract a moment created by a weight of the quick swap sensor pod and the upper surface is configured to support the weight of the quick swap sensor pod.

The bracket of the preceding clause, further comprising a planar mating surface on the arm, the planar mating surface configured to be installed on a vehicle.

The bracket of any preceding clause, wherein the length of the pin is further selected to allow installation of the quick swap sensor pod by a single operator.

The bracket of any preceding clause, further comprising one or more openings for receiving one or more fasteners configured to secure the bracket to the arm of the quick swap sensor pod.

The bracket of any preceding clause, wherein the upper surface of the protrusion is configured to receive a lower surface of the arm of the quick swap sensor pod to support the weight of the quick swap sensor pod.

The bracket of any preceding clause, wherein the arm is configured to be assembled and disassembled on the pin a plurality of times.

A quick swap sensor pod for a truck, the quick swap sensor pod including a sensor pod arm, a bracket coupled to the sensor pod arm, and a support axle, wherein the quick swap sensor pod and the sensor pod arm are configured to rotate about the support axle and with respect to the bracket between an initial position and a final position, and wherein, in both the initial position and the final position, a length of the support axle is selected to counteract a moment created by a weight of the quick swap sensor pod and to support the weight of the quick swap sensor pod.

The quick swap sensor pod of any preceding clause, wherein the support axle extends vertically and is configured to couple the sensor pod arm and the bracket.

The quick swap sensor pod of any preceding clause, the support axle including a pin receiving opening having a depth, and a pin for installation in the pin receiving opening.

The quick swap sensor pod of any preceding clause, wherein the pin receiving opening extends from the sensor pod arm and the pin extends from the bracket.

The quick swap sensor pod of any preceding clause, wherein the pin receiving opening extends from the bracket and the pin extends from the sensor pod arm.

The quick swap sensor pod of any preceding clause, further comprising a conduit connector within the sensor pod arm for coupling a conduit to the quick swap sensor pod.

The quick swap sensor pod of any preceding clause, wherein the length of the support axle is further selected to allow installation of the quick swap sensor pod by a single operator.

The quick swap sensor pod of any preceding clause, further comprising one or more openings on the bracket aligned with one or more openings on the sensor pod arm, the aligned one or more openings configured to receive one or more fasteners to secure the sensor pod arm to the bracket in the final position.

The quick swap sensor pod of any preceding clause, wherein the sensor pod arm is configured to be assembled and disassembled on the bracket a plurality of times via the support axle.

A quick swap sensor pod for a truck, the quick swap sensor pod including a sensor pod arm having a sensor pod arm protrusion with a lower surface, and a bracket having a bracket arm protrusion with an upper surface, wherein the bracket arm protrusion is configured to support the weight of the sensor pod when the lower surface rests on the upper surface.

The quick swap sensor pod of any preceding clause, further comprising a bracket pin extending from the upper surface and a pin receiving opening extending through the lower surface, wherein the bracket pin is received within the pin receiving opening.

The quick swap sensor pod of any preceding clause, further comprising one or more fasteners extending perpendicular to the bracket pin, the one or more fasteners for preventing rotational movement about the bracket pin.

The quick swap sensor pod of any preceding clause, wherein the depth of the pin receiving opening is further selected to allow installation of the quick swap sensor pod by a single operator.

The quick swap sensor pod of any preceding clause, further comprising a sensor pod arm plate extending from the sensor pod arm and a bracket plate extending from the bracket, the sensor pod arm plate coupled to the bracket plate with one or more fasteners to rigidly secure the sensor pod arm to the bracket and prevent relative movement therebetween.

The quick swap sensor pod of any preceding clause, further comprising a rotational joint between the sensor pod arm and the bracket.

An apparatus for reducing damage and debris in a sensor pod collision includes a bracket configured to couple a sensor pod to a vehicle, the bracket having a post, a sensor pod arm rotatable about the post, a fastener for securing the sensor pod arm to the post, and a frangible fixation point spaced apart from the post, the frangible fixation point configured to break apart at a predetermined force.

The apparatus of the preceding clause, wherein the sensor pod is supported on the post.

The apparatus of any preceding clause, wherein the frangible fixation point is configured to break apart at the predetermined force such that the sensor pod arm is rotatable with respect to the bracket.

The apparatus of any preceding clause, the sensor pod arm comprising an opening for receiving the post, wherein the fastener threads into the post to prevent the sensor pod arm from being removed from the bracket.

The apparatus of any preceding clause, wherein the frangible fixation point comprises one or more fasteners configured to shear at the predetermined force.

The apparatus of any preceding clause, wherein the one or more fasteners comprises two fasteners spaced apart and parallel to each other.

The apparatus of any preceding clause, wherein a longitudinal axis of the frangible fixation point is perpendicular to a longitudinal axis of the post.

The apparatus of any preceding clause, wherein the predetermined force is a collision force on the sensor pod.

The apparatus of any preceding clause, wherein a first moment arm acts on the frangible fixation point and a second moment arm acts on the sensor pod arm, the first moment arm being shorter than the second moment arm.

The apparatus of any preceding clause, wherein the first moment arm and the second moment arm are caused by a weight of the sensor pod acting on the sensor pod arm.

A method for reducing damage in a sensor pod collision including fixing a post on a bracket to a sensor pod, generating a first fixation point, rotating the sensor pod into alignment with the bracket to align a second fixation point, and tightening the second fixation point to secure the sensor pod to the bracket, wherein the second fixation point is tightened to a load less than a tension necessary to release the second fixation point, wherein the second fixation point is configured to fail at a predetermined force.

The method of any preceding clause, further comprising applying the predetermined force to the sensor pod thus causing the second fixation point to break.

The method of any preceding clause, further comprising rotating the sensor pod from the aligned position toward a misaligned position due to the predetermined force on the sensor pod and the failed second fixation point.

The method of any preceding clause, wherein the predetermined force is sufficient to break the second fixation point but is not sufficient to break the first fixation point.

An assembly for reducing damage and debris in a sensor pod collision including a bracket, a sensor pod arm rotatable with respect to the bracket, and a frangible fixation point configured to break apart at a predetermined force, wherein the assembly has: a first state having a horizontal axis of the bracket and a horizontal axis of the sensor pod arm are collinear, wherein the frangible fixation point is fixed in the first state, and a second state having the horizontal axis of the bracket angled with respect to the horizontal axis of the sensor pod arm, wherein the frangible fixation point is not fixed in the second state.

The assembly of any preceding clause, wherein the sensor pod arm is supported on the bracket.

The assembly of any preceding clause, wherein the assembly is caused to move from the first state to the second state due to the predetermined force.

The assembly of any preceding clause, wherein the predetermined force is a collision force on a sensor pod.

The assembly of any preceding clause, further comprising a sensor pod, wherein the sensor pod is rotatable with respect to the bracket with a support axle.

The assembly of any preceding clause, wherein the sensor pod is configured to rotate about the support axle from the first state to the second state.

The assembly of any preceding clause, wherein the support axle is formed by a post extending from the bracket and an opening in the sensor pod arm, the post located within the opening.

The assembly of any preceding clause, further comprising a fastener configured to secure the support axle to the sensor pod arm.

The assembly of any preceding clause, wherein a longitudinal axis of the frangible fixation point is perpendicular to a longitudinal axis of the support axle.

The assembly of any preceding clause, wherein the frangible fixation point comprises one or more fasteners configured to shear at the predetermined force.

The assembly of any preceding clause, wherein the one or more fasteners comprises two fasteners spaced apart and parallel to each other.

The assembly of any preceding clause, wherein a first moment arm acts on the frangible fixation point and a second moment arm acts on the sensor pod arm, the first moment arm being shorter than the second moment arm.

The assembly of any preceding clause, wherein the first moment arm and the second moment arm are caused by a weight of a sensor pod acting on the sensor pod arm.

An apparatus for reducing damage and debris in a sensor pod collision including a bracket configured to couple a sensor pod to a vehicle, a sensor pod arm coupled to the bracket, and a frangible fixation point extending through the sensor pod arm, the frangible fixation point configured to break apart at a predetermined force.

The apparatus of any preceding clause, further comprising a support axle extending between the sensor pod arm and the bracket.

The apparatus of any preceding clause, wherein the frangible fixation point is configured to break apart at the predetermined force such that the sensor pod arm is rotatable with respect to the bracket.

The apparatus of any preceding clause, wherein the frangible fixation point comprises one or more fasteners configured to shear at the predetermined force, the one or more fasteners extending perpendicular to the support axle.

The apparatus of any preceding clause, wherein the predetermined force is a collision force on the sensor pod.

The apparatus of any preceding clause, wherein the frangible fixation point is a crumple zone.

The apparatus of any preceding clause, wherein the crumple zone comprises at least one side of the sensor pod arm formed of a weaker material than at least one other side of the sensor pod arm.

The apparatus of any preceding clause, wherein the sensor pod arm further comprises an upper side, a lower side, a first lateral side, and a second lateral side, and wherein the crumple zone comprises the upper side and the lower side.

The apparatus of any preceding clause, wherein the upper side and the lower side are formed of weaker materials than the first lateral side and the second lateral side.

The apparatus of any preceding clause, wherein the crumple zone allows the sensor pod arm to bend in a vertical direction.

The apparatus of any preceding clause, wherein the predetermined force is a force that causes one or more sides of the sensor pod arm to bend or break.

The apparatus of any preceding clause, wherein frangible fixation point comprises rotational joint.

The apparatus of any preceding clause, wherein the predetermined force is a force that counteracts a spring of the rotational joint.

A connecting assembly for connecting sensors in a sensor pod to a vehicle. The connecting assembly includes a conduit connector located on a housing of the sensor pod, a conduit configured to connect with the conduit connector and extending from the conduit connector to the vehicle, and a conduit connector point located at a connection between the conduit connector and the conduit, wherein the conduit connector point has a first shear strength when the conduit is in tension and the conduit has a second shear strength when the conduit is in tension, the first shear strength being less than the second shear strength.

The connecting assembly of the preceding clause, wherein the conduit connector is a plurality of conduit connectors and the conduit is a plurality of conduits, each of the plurality of conduits being connected at a conduit connector point to a respective conduit connector of the plurality of conduit connectors.

The connecting assembly of any preceding clause, wherein each of the plurality of conduits has the second shear strength and each of the conduit connector points has a shear strength less than the second shear strength.

The connecting assembly of any preceding clause, wherein the conduit comprises a length of slack such that the conduit is configured to stay connected to the conduit connector point when the sensor pod is rotated between a first position and a second position.

The connecting assembly of any preceding clause, further comprising a cavity in which the conduit connector, the conduit, and the conduit connector point are located.

The connecting assembly of any preceding clause, further comprising a removable cover configured to allow selective access to the cavity.

The connecting assembly of any preceding clause, wherein the conduit is a water conduit, an air conduit, or an electrical conduit.

The connecting assembly of any preceding clause, wherein the conduit is configured to interact with the sensor pod and with a different sensor pod that is mounted on the connecting assembly after the sensor pod is removed.

The connecting assembly of any preceding clause, wherein the conduit is configured to disconnect from the conduit connector point when the first shear strength is exceeded.

A connecting assembly for connecting sensors in a sensor pod to a vehicle. The connecting assembly includes an arm, a conduit connector located on a housing of the sensor pod, a conduit configured to connect with the conduit connector and extending from the conduit connector through the arm and to the vehicle, and a conduit connector point located within the arm at a connection between the conduit connector and the conduit, wherein the arm is configured to pivot between a first position and a second position, and wherein the conduit has a length of slack such that the conduit remains connected to the conduit connector at the conduit connector point when the arm is pivoted between the first position and the second position.

The connecting assembly of any preceding clause, wherein the conduit connector is a plurality of conduit connectors and the conduit is a plurality of conduits, each of the plurality of conduits being connected at a conduit connector point to a respective conduit connector of the plurality of conduit connectors.

The connecting assembly of any preceding clause, further comprising a cavity in which the conduit connector, the conduit, and the conduit connector point are located.

The connecting assembly of any preceding clause, further comprising a removable cover configured to allow selective access to the cavity.

The connecting assembly of any preceding clause, wherein the conduit is a water conduit, an air conduit, or an electrical conduit.

The connecting assembly of any preceding clause, wherein the conduit is configured to interact with the sensor pod and with a different sensor pod that is mounted on the connecting assembly after the sensor pod is removed.

The connecting assembly of any preceding clause, wherein the length of slack comprises a length of the conduit that extends from the vehicle to the conduit connector, the length of slack being longer than an internal length of the arm to allow for the conduit to maintain connection at the conduit connector point when the arm is moved from the first position to the second position.

The connecting assembly of any preceding clause, wherein the arm has a first lateral distance in the first position and a second lateral distance in the second position, the second lateral distance greater than the first lateral distance.

The connecting assembly of any preceding clause, wherein a length of the conduit is at least equal to the second lateral distance.

The connecting assembly of any preceding clause, wherein the length of slack is at least equal to the difference between the second lateral distance and the first lateral distance.

The connecting assembly of any preceding clause, wherein the conduit is configured to disconnect from the conduit connector point at a force lower than a force to sever the conduit.

A method of installing a sensor pod on a vehicle includes aligning a sensor pod arm with a bracket attached to the vehicle, lowering the sensor pod arm onto the bracket, supporting the weight of the sensor pod on a support axle between the bracket and the sensor pod arm before rigidly coupling the sensor pod arm to the bracket, rotating the sensor pod arm into alignment with the bracket, and securing the sensor pod arm to the bracket.

A method according to the preceding clause, further including extending one or more conduits through the bracket and the sensor pod arm to couple the one or more conduits to the sensor pod.

A method according to any preceding clause, further including securing a cover to the sensor pod arm to enclose the one or more conduits therein.

A method according to any preceding clause, further including connecting the one or more conduits to the sensor pod before rotating the sensor pod arm into alignment with the bracket.

A method according to any preceding clause, further including securing the sensor pod arm to the support axle.

A method according to any preceding clause, wherein aligning the sensor pod arm with the bracket includes aligning an opening on the sensor pod arm with the support axle on the bracket.

A method according to any preceding clause, further including receiving the support axle in the opening.

A method according to any preceding clause, further including securing the sensor pod arm to the bracket with one or more frangible fasteners.

A method according to any preceding clause, further including securing the sensor pod arm to the bracket in the aligned position.

A method according to any preceding clause, further including fixing the bracket to the vehicle prior to lowering the sensor pod arm on the bracket.

A method of uninstalling a sensor pod on a vehicle includes unsecuring a sensor pod arm from a bracket, rotating the sensor pod arm out of alignment with the bracket, disconnecting one or more conduits from the sensor pod, and raising the sensor pod arm off the bracket to disconnect a support axle between the bracket and the sensor pod arm.

A method according to any preceding clause, further including removing the one or more conduits from the sensor pod arm.

A method according to any preceding clause, further including unsecuring a cover from the sensor pod arm prior to disconnecting the one or more conduits from the sensor pod.

A method according to any preceding clause, further including disconnecting the one or more conduits from the sensor pod after rotating the sensor pod arm out of alignment with the bracket.

A method according to any preceding clause, further including unsecuring the sensor pod arm to the support axle by removing a fastener.

A method according to any preceding clause, further including removing one or more frangible fasteners from the bracket prior to raising the sensor pod arm off the bracket.

A method according to any preceding clause, further including allowing the bracket to remain fixed to the vehicle.

A method according to any preceding clause, further including installing another sensor pod on the bracket.

A method according to any preceding clause, further including disconnecting the bracket from the vehicle.

A method according to any preceding clause, wherein the sensor pod arm and the bracket are aligned prior to unsecuring the sensor pod arm from the bracket.

Although the foregoing description is directed to the preferred embodiments, it is noted that other variations and modifications will be apparent to those skilled in the art and may be made without departing from the spirit or scope of the disclosure. Moreover, features described in connection with one embodiment may be used in conjunction with other embodiments, even if not explicitly stated above.

The invention claimed is:

1. A method of installing a sensor pod on a vehicle, the sensor pod having one or more sensors therein, and the method comprising:

aligning a sensor pod arm of the sensor pod with a bracket attached to the vehicle, the sensor pod arm having a horizontal sensor pod arm axis and the bracket having a horizontal bracket axis;

lowering the sensor pod arm onto the bracket such that the horizontal sensor pod arm axis is at an angle greater than zero with respect to the horizontal bracket axis;

supporting a weight of the sensor pod with the one or more sensors on a support axle between the bracket and the sensor pod arm before rigidly coupling the sensor pod arm to the bracket;

rotating the sensor pod arm into alignment with the bracket such that the horizontal sensor pod arm axis is aligned with the horizontal bracket axis; and securing the sensor pod arm to the bracket by rigidly coupling the sensor pod arm and the bracket.

2. The method of claim 1, further comprising extending one or more conduits through the bracket and the sensor pod arm to couple the one or more conduits to the sensor pod.

3. The method of claim 2, further comprising securing a cover to the sensor pod arm to enclose the one or more conduits therein.

4. The method of claim 2, further comprising connecting the one or more conduits to the sensor pod before rotating the sensor pod arm into alignment with the bracket.

5. The method of claim 1, further comprising securing the sensor pod arm to the support axle.

6. The method of claim 1, wherein aligning the sensor pod arm with the bracket comprises aligning an opening on the sensor pod arm with the support axle on the bracket.

7. The method of claim 6, further comprising receiving the support axle in the opening.

8. The method of claim 1, wherein securing the sensor pod arm to the bracket includes securing the sensor pod arm to the bracket with one or more frangible fasteners.

9. The method of claim 1, further comprising fixing the bracket to the vehicle prior to lowering the sensor pod arm on the bracket.

10. The method of claim 1, wherein the support axle is spaced from the horizontal sensor pod arm axis.

11. The method of claim 10, wherein the support axle is spaced from the horizontal bracket axis.

12. The method of claim 1, wherein securing the sensor pod arm to the bracket includes securing the sensor pod arm to the bracket with one or more fasteners that extend perpendicular to the horizontal sensor pod arm axis and the horizontal bracket axis.

13. The method of claim 1, wherein securing the sensor pod arm to the bracket includes preventing the sensor pod arm from rotating with respect to the bracket.

14. The method of claim 1, further comprising counter-acting, with the support axle, a moment created by the weight of the sensor pod such that the sensor pod arm is permitted to rotate about the support axle prior to securing the sensor pod arm to the bracket.

15. The method of claim 1, wherein securing the sensor pod arm to the bracket includes securing the sensor pod arm against vertical movement away from the bracket with one or more fasteners.

16. The method of claim 1, wherein securing the sensor pod arm to the bracket includes securing the sensor pod arm against lateral movement with respect to the vehicle with the support axle.

17. The method of claim 1, wherein rotating the sensor pod arm into alignment with the bracket includes rotating the sensor pod arm into alignment with the bracket such that a sensor pod arm side surface of the sensor pod arm is in touching contact with a bracket side surface of the bracket.

18. The method of claim 17, wherein lowering the sensor pod arm onto the bracket includes lowering the sensor pod arm onto the bracket at the angle greater than zero such that the sensor pod arm side surface of the sensor pod arm are free from contact with each other.

19. The method of claim 1, wherein securing the sensor pod arm to the bracket includes securing the sensor pod arm to the bracket in three directions to prevent relative movement of the sensor pod with respect to the bracket in the three directions.

* * * * *